(12) United States Patent
Takeuchi

(10) Patent No.: US 10,444,449 B2
(45) Date of Patent: Oct. 15, 2019

(54) OPTICAL TRANSCEIVER

(71) Applicant: SUMITOMO ELECTRIC DEVICE INNOVATIONS, INC., Yokohama-shi (JP)

(72) Inventor: Yuko Takeuchi, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 16/245,314

(22) Filed: Jan. 11, 2019

(65) Prior Publication Data

US 2019/0212509 A1    Jul. 11, 2019

(30) Foreign Application Priority Data

Jan. 11, 2018 (JP) .................................. 2018-002547
Dec. 20, 2018 (JP) .................................. 2018-238567

(51) Int. Cl.
*G02B 6/42* (2006.01)
*H01R 13/627* (2006.01)

(52) U.S. Cl.
CPC ......... *G02B 6/4261* (2013.01); *G02B 6/4284* (2013.01); *G02B 6/4292* (2013.01); *H01R 13/627* (2013.01)

(58) Field of Classification Search
CPC .. G02B 6/4261; G02B 6/4284; G02B 6/4292; H01R 13/627
USPC .............................................. 385/88, 92, 139
See application file for complete search history.

(56) References Cited

U.S. PATENT DOCUMENTS

2018/0329161 A1* 11/2018 Takeuchi ............. G02B 6/4246

FOREIGN PATENT DOCUMENTS

JP          2014-120481 A    6/2014

* cited by examiner

*Primary Examiner* — Michael P Mooney
(74) *Attorney, Agent, or Firm* — Baker Botts L.L.P.; Michael A. Sartori

(57) ABSTRACT

An optical transceiver which is inserted and ejected with respect to a cage in a first direction is disclosed. The optical transceiver includes a slider having a slit including a slope in a second direction intersecting in the first direction, a housing supporting the slider to slide along the first direction, and a latch having a shaft sliding in the slit lining up in the first direction in response to a projection, the projection engaging the cage and standing out from a surface of the latch in the second direction. The housing has a pair of convexes contacted both surface in each other of area between the projection and the shaft of the latch, and the pair of convexes of the housing supports the latch to slide.

13 Claims, 31 Drawing Sheets

Fig.4
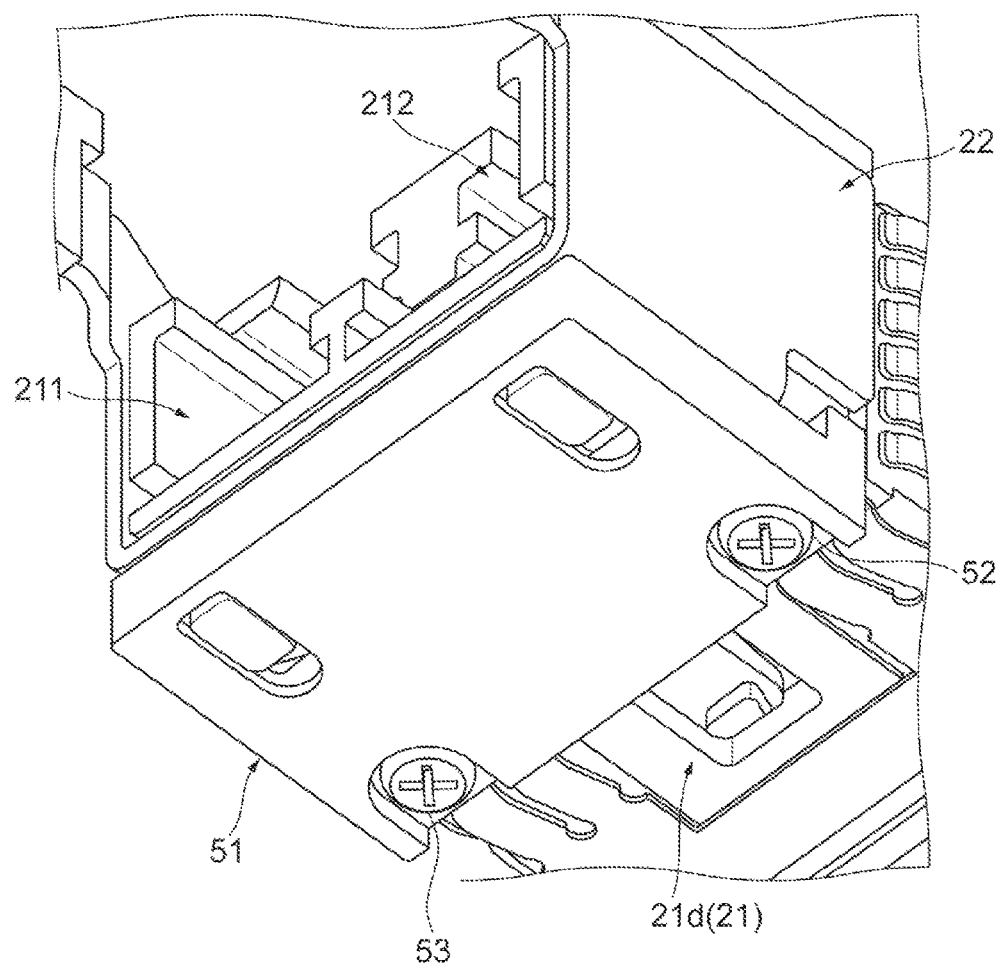
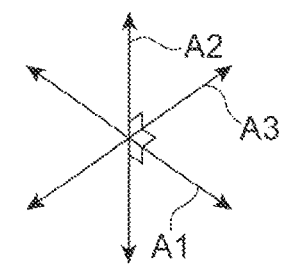

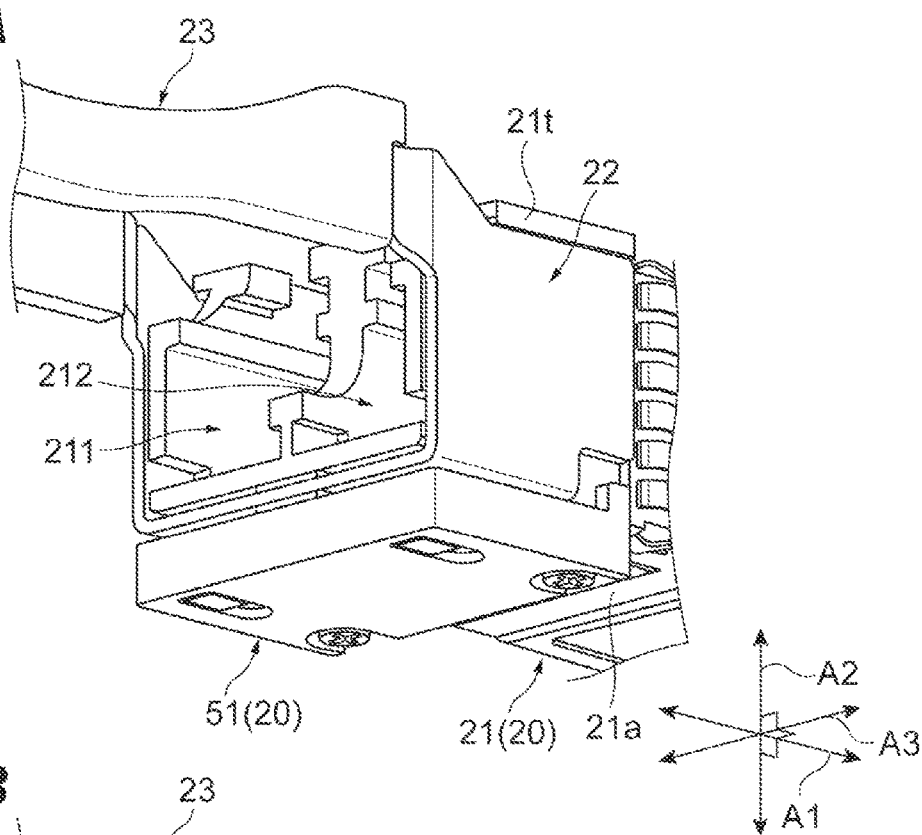
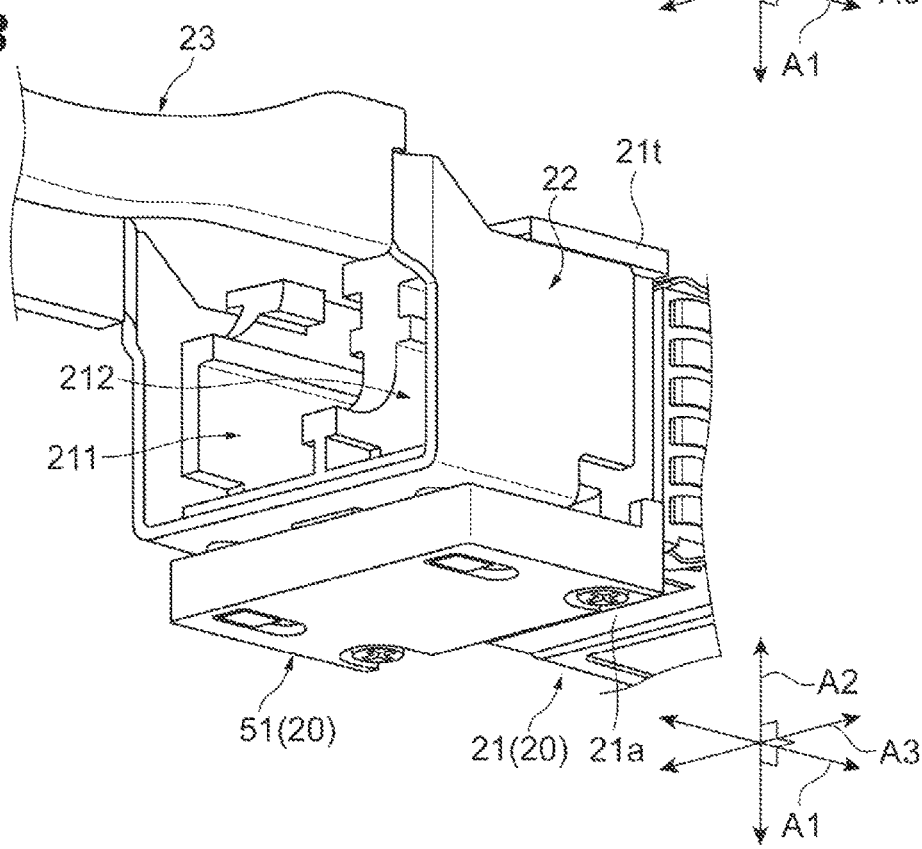

Fig.7
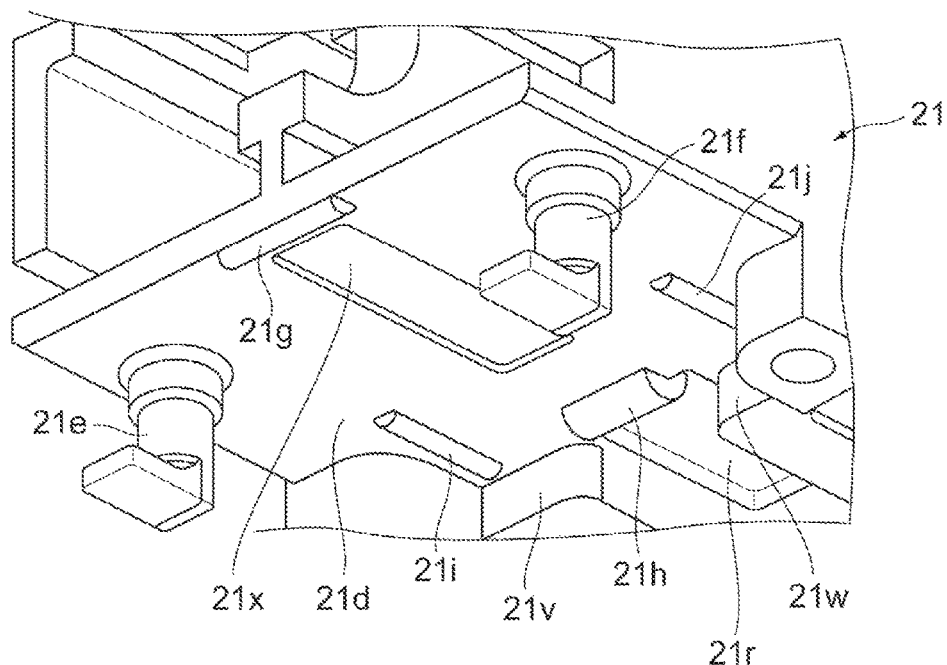
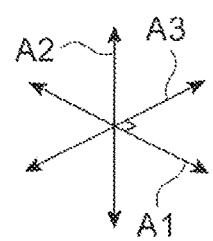

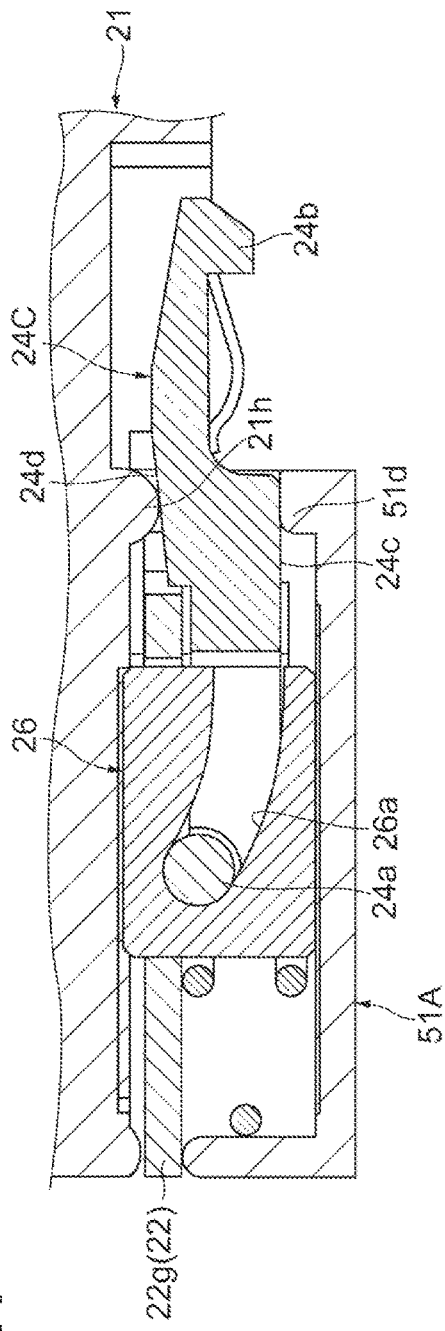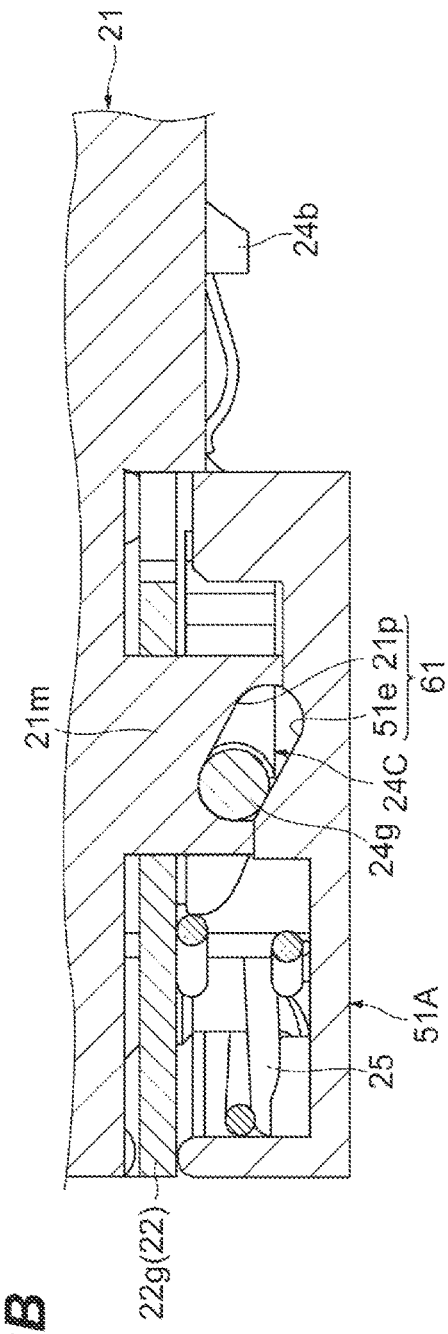

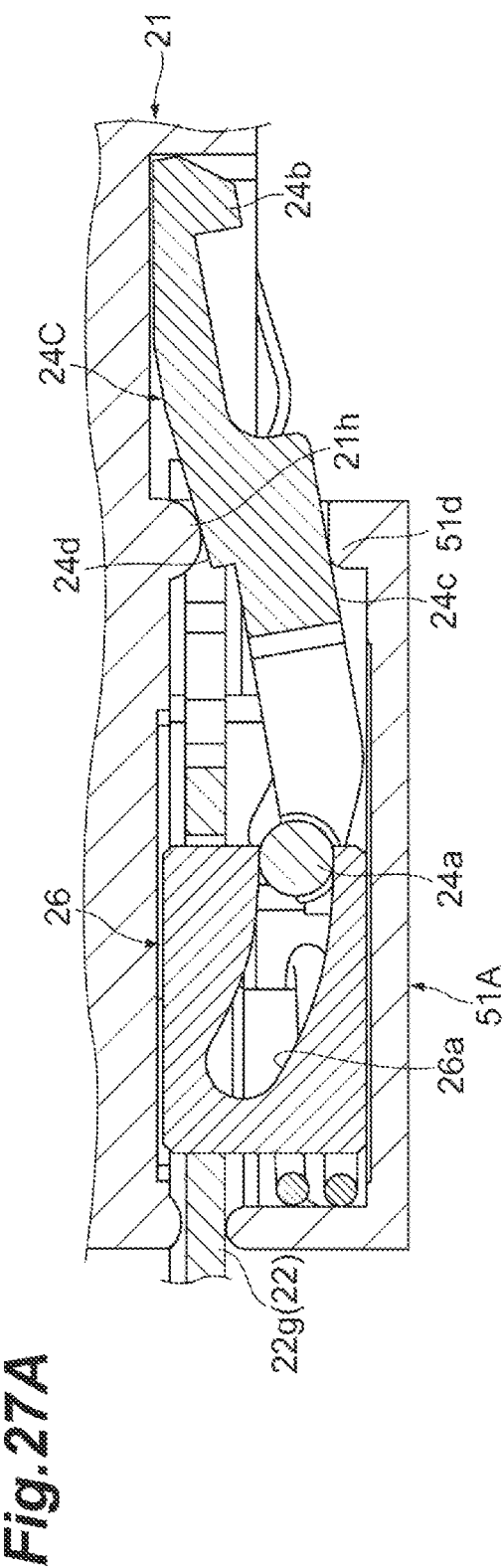
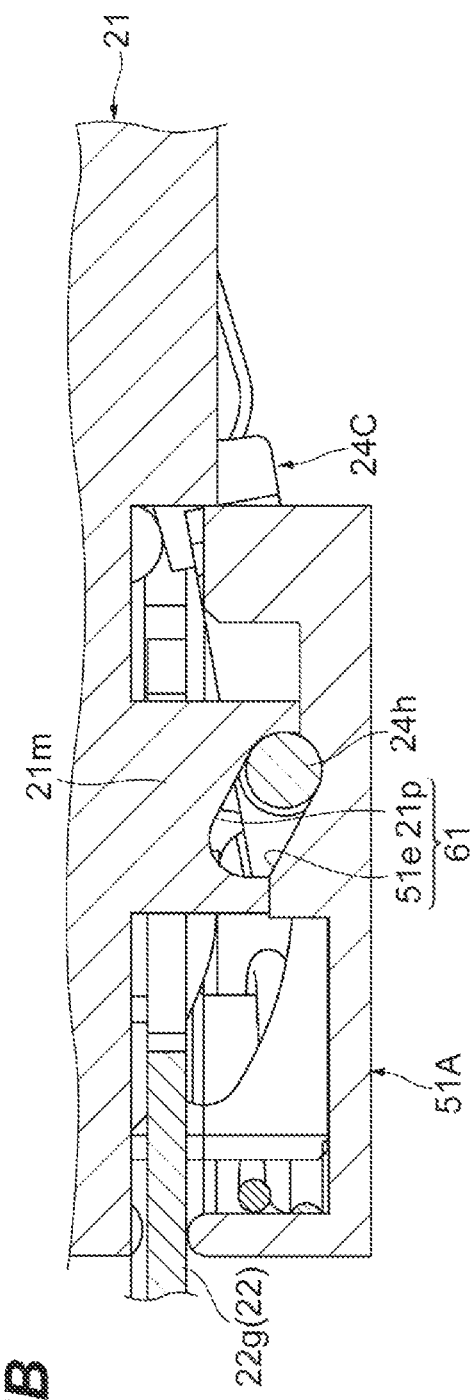
Fig.27A
Fig.27B

OPTICAL TRANSCEIVER

CROSS REFERENCE TO RELATED APPLICATIONS

This application claims the priority benefit of Japanese Applications No. JP2018-002547 filed on Jan. 11, 2018 and JP2018-238567 filed on Dec. 20, 2018, the entire contents of which are incorporated herein by references.

TECHNICAL FIELD

This disclosure relates to an optical transceiver.

BACKGROUND

Japanese Unexamined Patent Publication No. 2014-120481 describes a technique relating to a data communication module as an optical transceiver. The data communication module includes: a rectangular parallelepiped housing extending in an insertion direction into a cage; a T-shaped crank connected to the housing at a crank pivot; and an actuator handle connected to the crank at a wrist pivot. The crank and the actuator handle constitute a delatch mechanism that releases engagement between the data communication module and the cage. When a user pulls the actuator handle in a state where the data communication module is inserted in the cage, the actuator handle slides with respect to the housing, and the crank rotates. Along with this rotation, a pin provided at a terminal of the crank is lifted, and the engagement between the data communication module and the cage is released.

In the optical transceiver that is fit into and pulled from the cage of a host system, an optical connector extends from a rear surface (a surface opposite to the cage) of the optical transceiver. In the data communication module described in Japanese Unexamined Patent Publication No. 2014-120481, it is assumed that the actuator handle or the crank interferes with the optical connector when the user pulls the actuator handle. Further, the crank rotates outside the housing when the actuator handle is pulled in the data communication module, and thus, there is a case where it is difficult to use the optical transceiver in a limited space.

SUMMARY

One aspect of the present disclosure relates to an optical transceiver which is inserted and ejected with respect to a cage in a first direction. The optical transceiver includes: a slider having a slit including a slope in a second direction intersecting in the first direction; a housing supporting the slider to slide along the first direction; and a latch having a projection and a shaft sliding in the slit lining up in the first direction in response to the projection, the projection engaging the cage and standing out from a surface of the latch in the second direction. The housing has a pair of convexes that have the latch located therebetween wherein the pair of convexes contact an upper face and a lower face of the latch in the area between the projection and the shaft of the latch, and the pair of convexes of the housing supports the latch to slide.

BRIEF DESCRIPTION OF THE DRAWINGS

The foregoing and other purposes, aspects and advantages will be better understood from the following detailed description of a preferred embodiment of the invention with reference to the drawings, in which:

FIG. 4 is an enlarged perspective view illustrating a cover 51 attached to a main body 21;

FIGS. 5A and 5B are perspective views illustrating states where a slider 22 moves relative to a housing 20, FIG. 5A illustrates the state where the slider 22 has moved forward, and FIG. 5B illustrates the state where the slider 22 has moved backward;

FIG. 6A is the perspective view of the slider 22 and the pull-tab 23 as viewed obliquely from above, and FIG. 6B is the perspective view of the slider 22 and the pull-tab 23 as viewed obliquely from below;

FIG. 7 is an enlarged perspective view illustrating the vicinity of a front end of a bottom surface 21d of the main body 21;

FIG. 8A illustrates the state where the slider 22 has moved forward, and FIG. 8B illustrates the state where the slider 22 has moved backward;

FIG. 12A illustrates the external appearance of the latch 24 as viewed obliquely from above, and FIG. 12B illustrates the external appearance of the latch 24 as viewed obliquely from below;

FIGS. 26A and 26B are enlarged views illustrating a part of the optical transceiver 2A according to the third modification, FIG. 26A is a cross-sectional view taken along line XXVIa-XXVIa of FIG. 25, FIG. 26B is a cross-sectional view taken along line XXVIb-XXVIb of FIG. 25, and FIGS. 26A and 26B illustrate a state where the slider 22 has moved forward;

FIGS. 27A and 27B are enlarged views illustrating a part of the optical transceiver 2A according to the third modification, FIGS. 27A and 27B are cross-sectional views illustrating a state where the slider 22 has moved backward, FIG. 27A illustrates the same cross section as that of FIG. 26A, and FIG. 27B illustrates the same cross section as that of FIG. 26B;

FIG. 28A illustrates a state where the slider 22 has moved forward, and FIG. 28B illustrates a state where a position of the slider 22 has slightly varied from FIG. 28A;

DETAILED DESCRIPTION

[Description of Embodiments of Present Disclosure]

Figure 1:
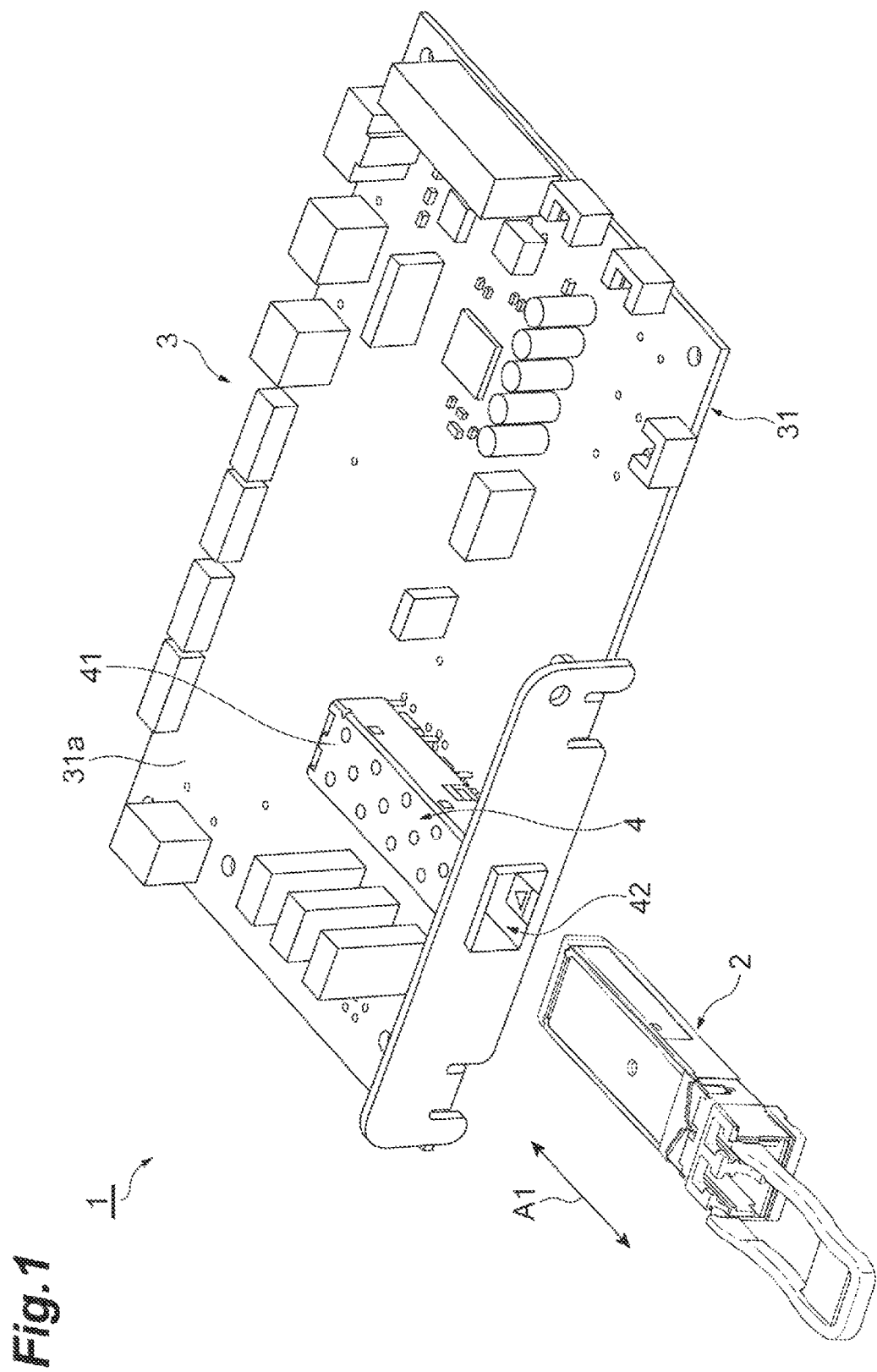
FIG. 1 is a perspective view illustrating a configuration of an optical transceiver fitting and pulling structure 1 according to one embodiment.

First, a description will be given by listing contents of embodiments of the present disclosure. An optical transceiver according to one embodiment is an optical transceiver to be fit into and pulled from a cage of a host system, and includes: a slider that has a slit including a portion inclined in a second direction intersecting a first direction with respect to a first direction which is an fitting and pulling direction; a housing that supports the slider so as to be movable along the first direction; a latch that has a projection, which projects in the second direction and is engaged with the cage, and a shaft which is aligned in the first direction with respect to the projection and moves in the slit. The housing has a pair of convexes provided on both sides of the latch in the second direction. Each of the pair of convexes contacts the latch between the projection and the shaft to support the latch in a rockable manner.

In this optical transceiver, when the slider moves backward in a state where the optical transceiver is fit in the cage of the host system, the slit of the slider also moves backward, and thus, the shaft of the latch moves to the outside (cage side) of the optical transceiver. Since the latch is supported in a rockable manner by the pair of convexes of the housing, the projection of the latch moves to a side opposite to the cage side when the shaft of the latch moves toward the cage side. As a result, the engagement between the projection of the latch and the cage is released. According to such a mechanism, the engagement with the cage can be released only by linear movement of the slider and rocking of the latch, and a large crank as in Japanese Unexamined Patent Publication No. 2014-120481 is not required. Therefore, interference with the optical connector can be suppressed, and it is possible to use the optical transceiver even in a limited space.

The housing may include a first member including one convex positioned on the cage side between the pair of convexes and a second member including the other convex, and the first member and the second member may be fixed to each other. In this case, when the housing is assembled, it is possible to easily cause the pair of convexes to contact both sides of the latch by sandwiching the latch between the first member and the second member.

At least a portion including the slit of the slider may be arranged between the first member and the second member. As a result, the portion that is movable can be covered with the second member, and can be prevented from being caught by a structural body (the cage or the like) outside the optical transceiver. Therefore, removal and an abnormal operation of the slider can be reduced.

The housing may further include another slit including a portion inclined in the second direction with respect to the first direction, the latch may further include another shaft which is provided between a portion contacting the pair of convexes in the first direction and the shaft and moves inside the other slit, and the other slit may be formed by combining a concave formed in the first member and a concave formed in the second member. In this manner, the rocking motion of the latch can be made more stable since the housing has the other slit and the latch has the other shaft moving in the other slit. Further, the other shaft can be easily housed in the other slit when the housing is assembled since the concave of the first member and the concave of the second member are combined with each other to form the other slit.

The above optical transceiver may further include an elasticity member that biases the slider toward a position of the slider where the projection is engaged with the cage from a position of the slider where the engagement between the projection of the latch and the cage is released. As a result, it is possible to prevent unintentional release of the engagement between the projection of the latch and the cage.

The latch may have a concave formed on a surface opposite to the cage, and the concave may house a convex positioned on the side opposite to the cage side between the pair of convexes and may contact the convex on an inner surface thereof. As a result, excessive movement of the latch with respect to the housing in the first direction is restricted, and the latch can be stably retained at a predetermined position. In this case, a gap is provided between the concave and the convex in the first direction, and the gap may define a movable range of the latch in the first direction. As a result, it is possible to stably retain the latch within a predetermined movable range. Alternatively, in this case, an edge of the concave on the shaft side and the convex may contact each other, and the latch may rock around the edge of the concave. As a result, it is possible to restrict the movement of the latch to the side opposite to the shaft (that is, toward the projection).

The housing may further include the other slit including the portion inclined in the second direction with respect to the first direction, and the latch may further include the other shaft which is provided between the portion contacting the pair of convexes in the first direction and the shaft and moves inside the other slit. As a result, it is possible to further stabilize the rocking motion of the latch.

The slit may further have a portion extending in the first direction at a distal end of the portion inclined with respect to the first direction. As a result, when the movement of the slider is slight, the latch does not rock, so that unintentional release of engagement between the optical transceiver and the cage can be suppressed.

The slit may be bent, and a center of curvature thereof may be positioned on the side opposite to the cage side. As a result, it becomes easier for a rocking center of the latch to be positioned on the side opposite to the cage with respect to the latch, and a direction of movement of the projection can be set to a direction that is obliquely away from the cage when releasing the engagement. Therefore, it is possible to reduce the stuck between the projection and the cage when releasing the engagement.

In the latch, a width of a portion contacting the pair of convexes in the second direction may gradually increase as approaching the projection. As a result, it becomes easier for a rocking center of the latch to be positioned on the side opposite to the cage with respect to the latch, and a direction of movement of the projection can be set to a direction that is obliquely away from the cage when releasing the engagement. Therefore, it is possible to reduce the stuck between the projection and the cage when releasing the engagement.

Surfaces of the pair of convexes which contact the latch may be curves bent in a cross section taken along the first direction and the second direction. Thus, the rocking motion of the latch can be made smoother.

[Detailed Description of Embodiments of Present Disclosure]

Next, embodiment according to the present disclosure will be described as referring to accompanying drawings. The present disclosure, however, is not restricted to the embodiment and has a scope defined in claims attached hereto and all changes and/or modifications with the scope and equivalent there to. In the description of the drawings, numerals or symbols same with or similar to each other will refer to elements same with or similar to each other without overlapping explanations.

FIG. 1 is a perspective view illustrating a configuration of an optical transceiver fitting and pulling structure 1 according to the present embodiment. As illustrated in the drawing, the optical transceiver fitting and pulling structure 1 includes an optical transceiver 2 and a cage 4 provided in a host 3. The host 3 has a printed circuit board 31, and a large number of electronic components are mounted on a mounting surface 31a of the printed circuit board 31. The cage 4 is also mounted on the mounting surface 31a. The cage 4 has a cage body 41 extending along a fitting and pulling direction (first direction) A1. A cross-sectional shape of the cage body 41 perpendicular to the fitting and pulling direction A1 is, for example, a rectangle. The cage body 41 has a space for housing the optical transceiver 2. Further, the cage body 41 has an opening 42 at one end of the space in the fitting and pulling direction A1. The opening 42 is positioned at an edge of the printed circuit board 31 and faces the outer side of the printed circuit board 31. The cage 4 is made of metal, for example.

Figure 2:
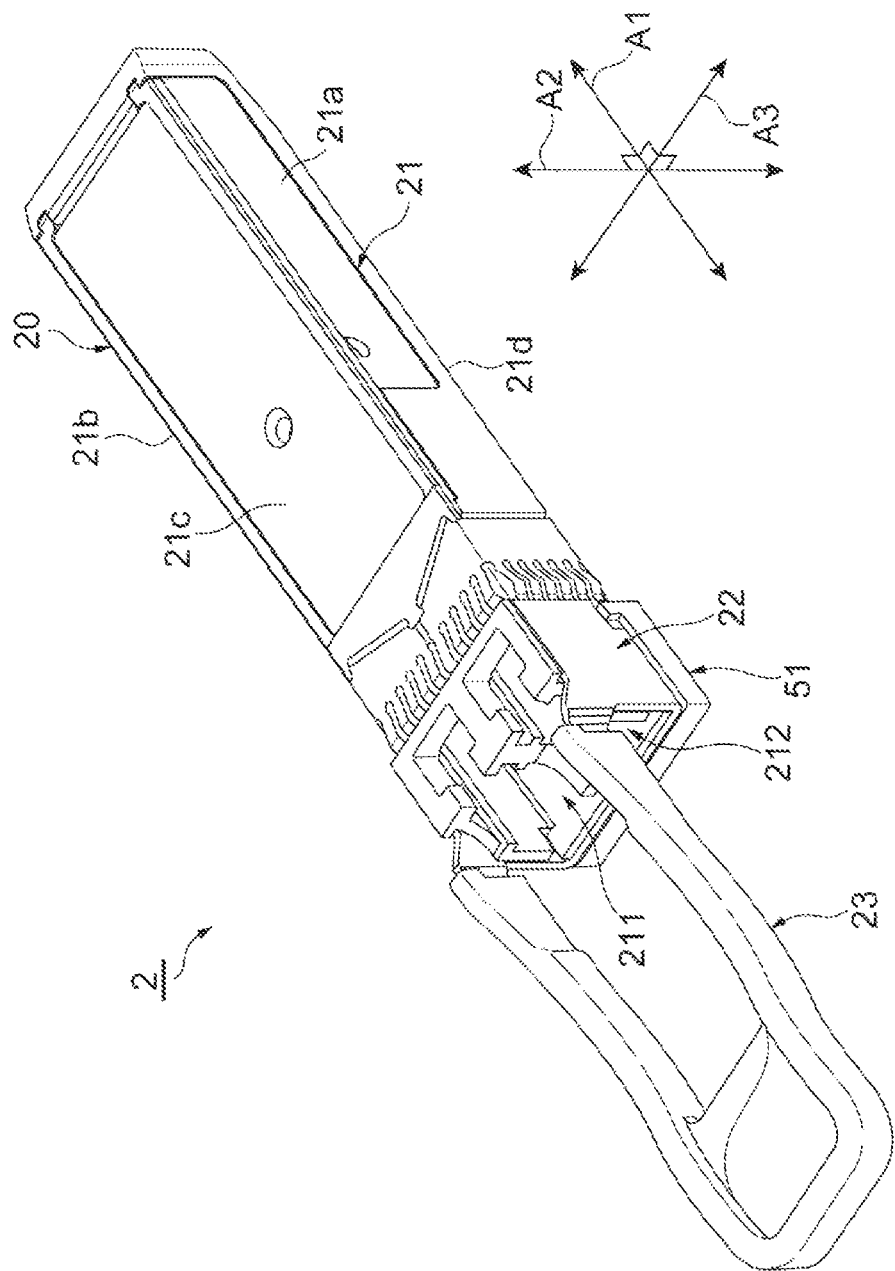
FIG. 2 is a perspective view illustrating an external appearance of an optical transceiver 2, and is the view of the optical transceiver 2 as viewed obliquely from above.
Figure 3:
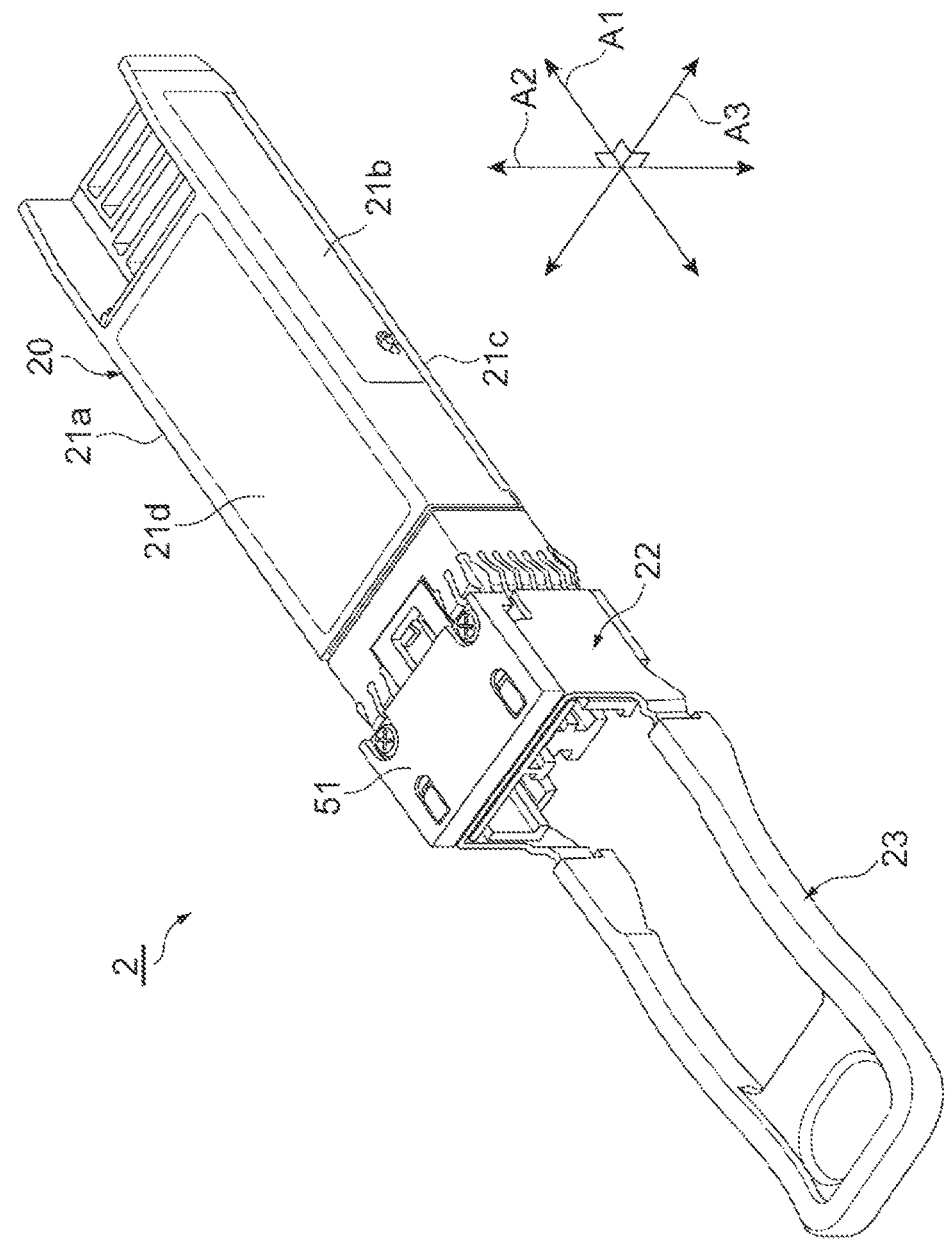
FIG. 3 is a perspective view illustrating the external appearance of the optical transceiver 2, and is the view of the optical transceiver 2 as viewed obliquely from below.

The optical transceiver 2 conforms to the SFP standard and performs full-duplex two-way optical communication. The optical transceiver 2 is fit and pulled into and from the cage body 41 of the cage 4 through the opening 42 along the fitting and pulling direction A1. FIGS. 2 and 3 are perspective views illustrating an external appearance of the optical transceiver 2. FIG. 2 is the perspective view of the optical transceiver 2 as viewed obliquely from above, and FIG. 3 is the perspective view of the optical transceiver 2 as viewed obliquely from below. As illustrated in FIGS. 2 and 3, the optical transceiver 2 includes a housing 20, a slider 22, and a pull-tab 23. Incidentally, FIGS. 2 and 3 illustrates not only the fitting and pulling direction A1 but also a direction A2 (second direction) intersecting (for example, orthogonal to) the fitting and pulling direction A1, and a direction A3 intersecting (for example, orthogonal to) the fitting and pulling direction A1 and the direction A2.

The housing 20 includes a main body 21 and a cover 51. The main body 21 is a second member according to the present embodiment. The main body 21 is an elongated metal member extending along the fitting and pulling direction A1. A cross-sectional shape of the main body 21 perpendicular to the fitting and pulling direction A1 is, for example, a rectangle. The main body 21 has a pair of side surfaces 21a and 21b extending along the fitting and pulling direction A1, a top surface 21c, and a bottom surface 21d. Further, the main body 21 houses a pair of optical receptacles 211 and 212, coupled to an optical connector provided at a distal end of the optical fiber, at one end in the fitting and pulling direction A1. Further, the main body 21 houses an electrical connector to be connected to an electrical connector provided inside the cage 4 at the other end in the fitting and pulling direction A1. In the following description, a direction toward one end on the electrical connector side of the optical transceiver 2 will be referred to as a front side, and a direction toward one end on the optical receptacles 211 and 212 side will be referred to as a back side.

FIG. 4 is an enlarged perspective view illustrating the cover 51 attached to the main body 21. The cover 51 is a first member according to the present embodiment. As illustrated in FIG. 4, the cover 51 is fixed to the bottom surface 21d of the main body 21 by screws 52 and 53. The cover 51 is a plate-like member extending along the bottom surface 21d and covers a portion of the bottom surface 21d positioned directly under the optical receptacles 211 and 212 (in other words, a portion near a rear end of the bottom surface 21d). The cover 51 is, for example, made of zinc die-cast.

The slider 22 is a member that is attached to the housing 20 and moves relative to the housing 20 along the fitting and pulling direction A1. The slider 22 is mainly made of metal and is provided at a position near a rear end of the housing 20. The slider 22 surrounds three sides (a part of each of the side surfaces 21a and 21b and the bottom surface 21d illustrated in FIG. 3) in a rectangular cross section of the main body 21 of the housing 20. The slider 22 is formed, for example, by bending a plate-like member. A portion on the bottom surface 21d of the slider 22 is arranged between the main body 21 and the cover 51.

The pull-tab 23 is a substantially U-shaped member connected to the slider 22. The pull-tab 23 is made of a material (for example, a flexible resin) that is softer than the housing 20 and the slider 22. When the substantially U-shaped pull-tab 23 and the slider 22 are coupled to each other, a ring structure is constituted therefrom. A worker can insert a finger into this ring structure to pull the pull-tab 23 in the pulling direction. Incidentally, it is sufficient that the pull-tab 23 can be pulled in the pulling direction by pinching or the like of the worker, and the shape of the pull-tab 23 is not limited to the substantially U shape.

FIGS. 5A and 5B are perspective views illustrating states where the slider 22 moves relative to the housing 20. FIG. 5A illustrates the state where the slider 22 has moved forward, and FIG. 5B illustrates the state where the slider 22 has moved backward (that is, the state where the pull-tab 23 is pulled in the pulling direction). When the pull-tab 23 is pulled in the pulling direction, a force applied to the pull-tab 23 is transmitted to the slider 22. As a result, the slider 22 moves backward relative to the housing 20. When the force to pull the pull-tab 23 disappears, the slider 22 automatically moves forward relative to the housing 20 by the action of an elasticity member to be described later and returns to the original position.

Figure 6A:
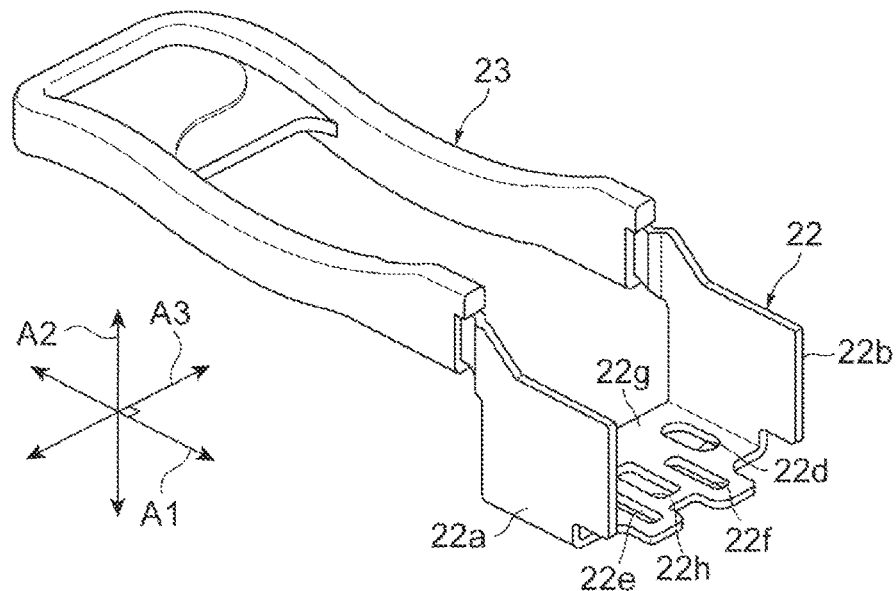
FIGS. 6A and 6B are perspective views illustrating an external appearance of the slider 22 and a pull-tab 23.
Figure 6B:
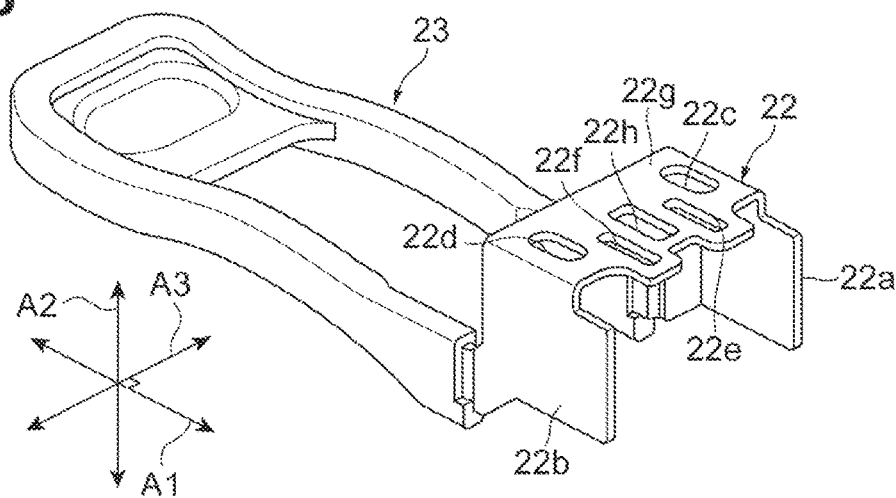

FIGS. 6A and 6B are perspective views illustrating an external appearance of the slider 22 and the pull-tab 23. FIG. 6A is the perspective view of the slider 22 and the pull-tab 23 as viewed obliquely from above, and FIG. 6B is the perspective view of the slider 22 and the pull-tab 23 as viewed obliquely from below. The slider 22 has a pair of side plates 22a and 22b and a bottom plate 22g connecting these side plates 22a and 22b to each other. The side plates 22a and 22b are positioned on the side surfaces 21a and 21b of the main body 21 of the housing 20, respectively, and extend along the side surfaces 21a and 21b, respectively. The main body 21 of the housing 20 has a pair of guides 21t (see FIGS. 5A and 5B, only one of the guides 21t is illustrated in the drawings) extending along the direction A1 and projecting outward (in the direction A3), and one end each of the side plates 22a and 22b on the side opposite to the bottom plate 22g contacts the guide 21t and slides in the direction A1 along the guide 21t. As a result, an inclination of the slider 22 during movement is suppressed. The bottom plate 22g is positioned on the bottom surface 21d of the main body 21 and extends along the bottom surface 21d. As described above, the bottom plate 22g is arranged between the bottom surface 21d of the main body 21 and the cover 51.

A plurality of openings (holes) 22c to 22f and 22h is formed in the bottom plate 22g. These openings 22c to 22f and 22h are formed with the fitting and pulling direction A1 as the longitudinal direction. The opening 22c and the opening 22d are aligned along the direction A3 intersecting with the fitting and pulling direction A1, and are positioned at both ends of the bottom plate 22g in the direction A3. The opening 22e and the opening 22f are aligned along the direction A3 and are positioned between the opening 22c and the opening 22d in the direction A3. The opening 22h is formed between the opening 22e and the opening 22f and substantially at the center of the bottom plate 22g in the direction A3.

FIG. 7 is an enlarged perspective view illustrating the vicinity of a front end of the bottom surface 21d of the main body 21. As illustrated in FIG. 7, a pair of hook-shaped projections 21e and 21f projects from the bottom surface 21d. The projections 21e and 21f are aligned along the direction A3 with an interval therebetween. The projection 21e is arranged in one of regions sandwiching the center axis of the bottom surface 21d along the fitting and pulling direction A1, and the projection 21f is arranged in the other region. Further, convexes 21g to 21j having semi-cylindrical surfaces are provided on the bottom surface 21d. Each of the convexes 21g and 21h extends along the direction A3. The convexes 21g and 21h are arranged on the central axis of the bottom surface 21d and are aligned along the fitting and pulling direction A1 such that the convex 21h is positioned forward with respect to the convex 21g. A concave 21r is formed further forward of the convex 21h. The convex 21h is formed to cover an edge of a rear end of the concave 21r. Each of the convexes 21i and 21j extends along the fitting and pulling direction A1. The convexes 21i and 21j are arranged on both sides sandwiching the central axis of the bottom surface 21d, respectively, and are aligned along the direction A3. Further, the main body 21 is provided with a pair of walls 21v and 21w which are side surfaces of a step formed on the bottom surface 21d. The walls 21v and 21w are aligned along the direction A3, and normal directions thereof extend along the direction A1. The walls 21v and 21w project from the bottom surface 21d along the direction A2.

Figure 8A:
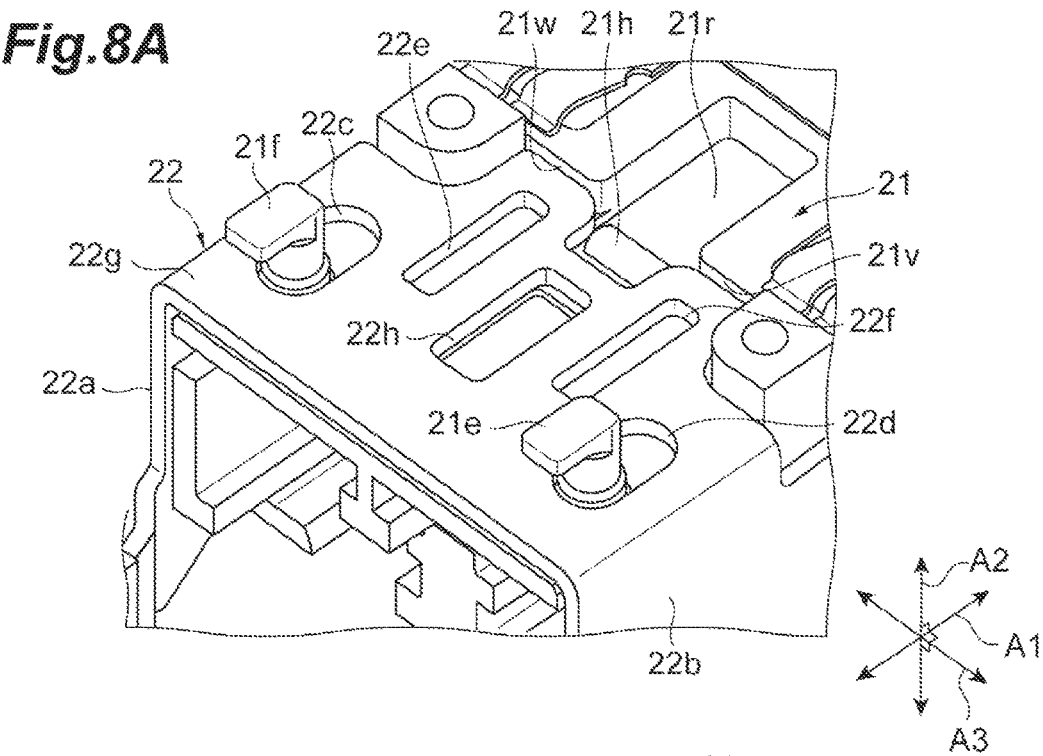
FIGS. 8A and 8B are perspective views illustrating states where a bottom plate 22g of the slider 22 is arranged on the bottom surface 21d of the main body 21.
Figure 8B:
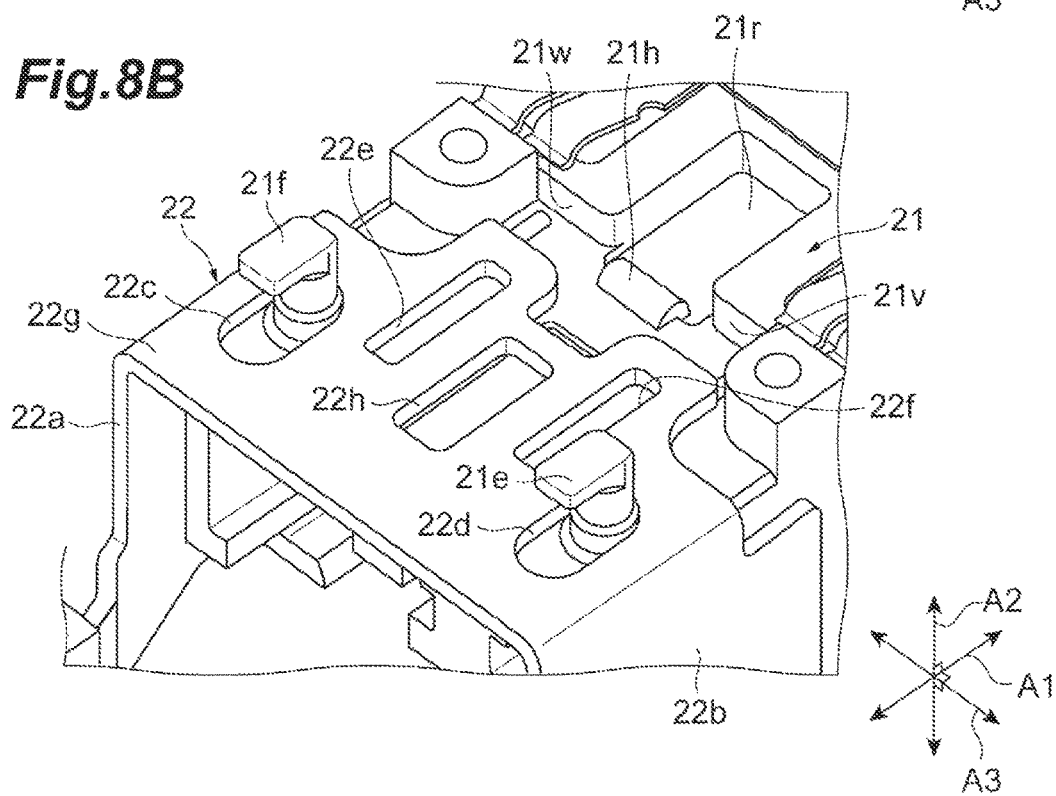

FIGS. 8A and 8B are perspective views illustrating states where the bottom plate 22g of the slider 22 is arranged on the bottom surface 21d of the main body 21. FIG. 8A illustrates the state where the slider 22 has moved forward, and FIG. 8B illustrates the state where the slider 22 has moved backward. As illustrated in these drawings, the projections 21e and 21f on the bottom surface 21d are fit into and engaged with the openings 22c and 22d of the slider 22, respectively. As a result, a movement range (mainly the back side) in the fitting and pulling direction A1 of the slider 22 is regulated, and the movement of the slider 22 in the direction A3 is restricted. The movement range in the fitting and pulling direction A1 of the slider 22 is determined depending on lengths of the openings 22c and 22d in the same direction. Further, the convexes 21g, 21i, and 21j on the bottom surface 21d illustrated in FIG. 7 contact the bottom plate 22g of the slider 22. The bottom plate 22g slides along the fitting and pulling direction A1 while contacting the convexes 21g, 21i, and 21j. Incidentally, the convex 21h on the bottom surface 21d is not covered with the bottom plate 22g and is exposed from the bottom plate 22g. As illustrated in FIG. 8A, when the slider 22 moves forward, the front end of the bottom plate 22g of the slider 22 in the direction A1 contacts the walls 21v and 21w. As a result, a range of movement of the slider 22 to the front side in the fitting and pulling direction A1 is restricted. According to such a structure in which the slider 22 is caused to contact the walls 21v and 21w which are the side surfaces of the step formed on the bottom surface 21d, a risk of deformation when a large force is applied is low, and the stuck of the slider 22 can be reduced as compared with the case of restricting the slider 22 using the projections 21e and 21f.

Figure 9:
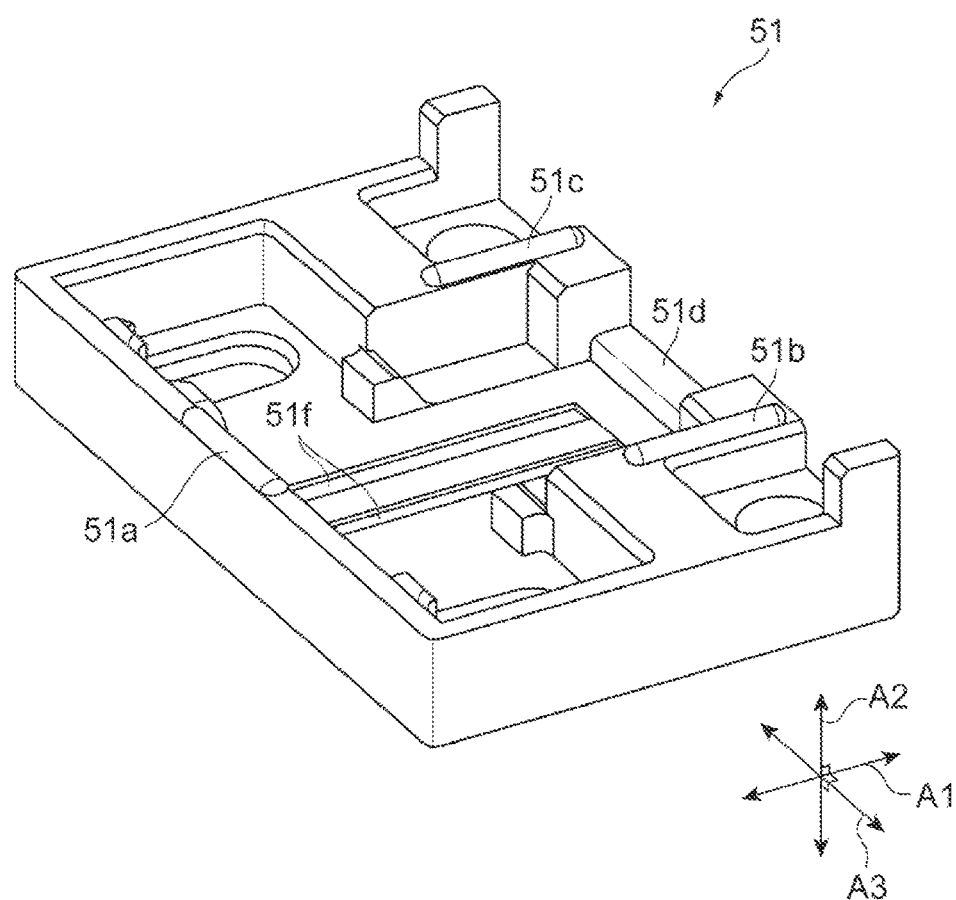
FIG. 9 is a perspective view illustrating an external appearance of the cover 51, which illustrates a shape of a surface of the cover 51 on a side facing the main body 21.

FIG. 9 is a perspective view illustrating an external appearance of the cover 51, which illustrates a shape of a surface of the cover 51 on a side facing the main body 21. As illustrated in FIG. 9, the cover 51 is provided with convexes 51a to 51d. The convexes 51a to 51c have semi-cylindrical surfaces. The convex 51d has a top surface facing the main body 21 and a side surface facing the back side. Further, a boundary (edge) between the top surface and the side surface is rounded to form a curve. Each of the convexes 51a and 51d extends along the direction A3. The convexes 51a and 51d are arranged on a central axis of the cover 51 along the fitting and pulling direction A1, and are aligned along the fitting and pulling direction A1 such that the convex 51d is positioned forward with respect to the convex 51g. The convexes 51a and 51d respectively face the convexes 21g and 21h (see FIG. 7) of the main body 21 described above. The convexes 51a and 51d are positioned on the cage body 41 side with respect to the convexes 21g and 21h. Each of the convexes 51b and 51c extends along the fitting and pulling direction A1. The convexes 51b and 51c are arranged on both sides sandwiching the center axis of the cover 51, respectively, and are aligned along the direction A3. The convexes 51b and 51c respectively face the convexes 21i and 21j (see FIG. 7) of the main body 21 described above. The convexes 51a to 51c contact the bottom plate 22g of the slider 22. The bottom plate 22g slides along the fitting and pulling direction A1 while contacting the convexes 51a to 51c. The bottom plate 22g of the slider 22 is sandwiched between each of the convexes 21g, 21i, and 21j of the main body 21 and each of the convexes 51a to 51c of the cover 51. As a result, the movement of the slider 22 in the direction A2 intersecting both the fitting and pulling direction A1 and the direction A3 is restricted. That is, the slider 22 sandwiched between the bottom surface 21d of the main body 21 of the housing 20 and the cover 51 is supported by the housing 20 so as to be movable along the fitting and pulling direction A1.

In this manner, the slider 22 is sandwiched between the cover 51 and the housing 20. Therefore, it is possible to prevent the slider 22 from being detached from the housing 20 even when an excessive force is applied to the slider 22 as compared with the configuration in which the cover is not provided and the slider is provided outside the housing. Accordingly, it is unnecessary to provide various structures for prevention of detachment and falling which are indispensable for a configuration in which the cover is not provided and the slider is provided outside the housing. In particular, in a system in which a slider is supported as the slider pinches a housing, a sliding resistance when moving the slider tends to become large. In the present embodiment, since the slider 22 is supported by the cover 51, a sliding resistance when moving the slider 22 can be reduced. Further, it is possible to cause a movable part such as the slider 22 to operate outside the housing 20. Therefore, as compared to a case where, for example, a movable part is arranged inside the housing 20, a mechanism for accessing the movable parts inside the housing 20 from the outside can be made unnecessary. Therefore, it is possible to miniaturize the optical transceiver 2.

The housing 20 and the cover 51 are in contact with the slider 22 at the convex shapes (the convexes 21g, 21i, and 21j and the convexes 51a to 51c) having the semi-cylindrical surfaces. As a result, the housing 20 and the cover 51 are hardly affected by bending stress from the slider 22, and are not easily affected by the shape (the edge or the like) of the slider 22 at the time of sliding. Therefore, the slider 22 can slide smoothly with respect to the housing 20 and the cover 51. Furthermore, it is easy to increase the accuracy, and thus, the stable operation is possible even when a dimension of the bottom plate 22g in the direction A1 is short, which contributes to further miniaturization of the optical transceiver 2.

The slider 22 of the present embodiment can be manufactured by a simple step such as sheet metal processing (bending and punching). Therefore, the slider 22 can be easily manufactured with high dimensional accuracy. Further, at the time of assembling, it is easy to perform the assembling only by placing the slider 22 over the main body 21 and screwing the cover 51 to the main body 21. Furthermore, there is no need to deform (open or the like) the slider 22 at the time of the assembling, and thus, a risk of unintentionally deformation of the slider 22 caused by the assembling is low.

Figure 10:
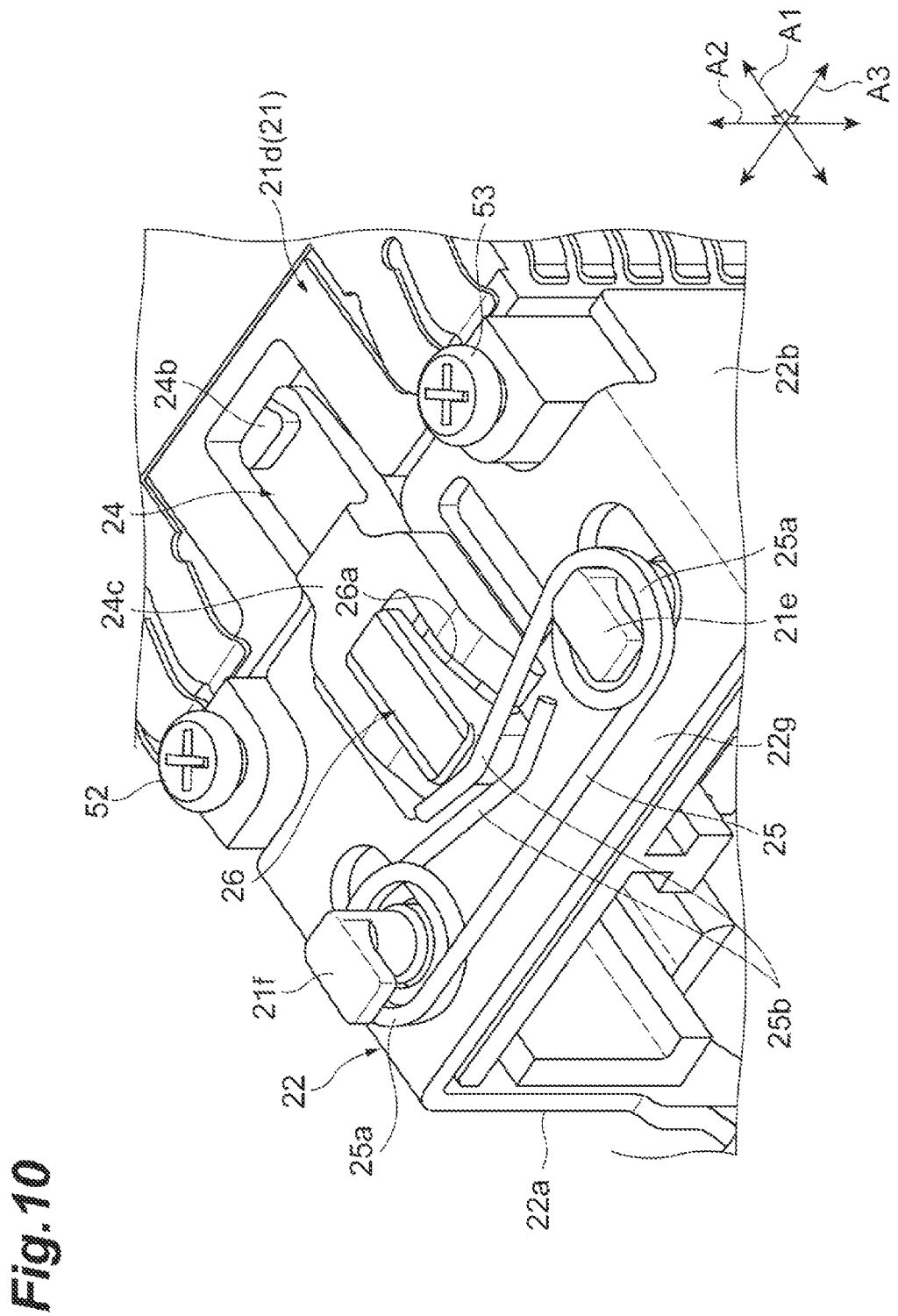
FIG. 10 is a view illustrating other components housed between the bottom surface 21d of the main body 21 and the cover 51, and is the perspective view of the bottom surface 21d from which the cover 51 is detached as viewed obliquely from below.
Figure 11:
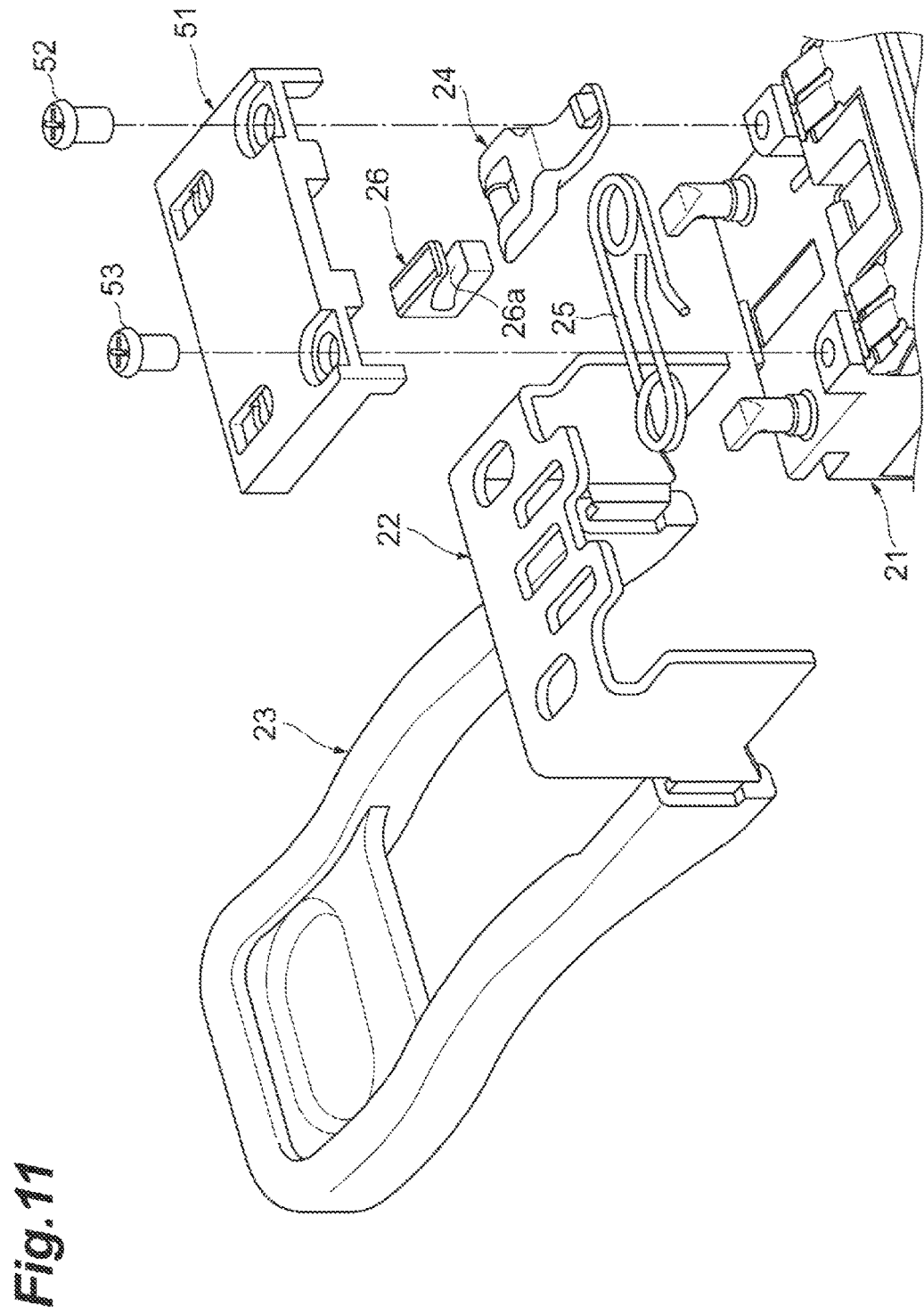
FIG. 11 is an exploded perspective view illustrating other components housed between the bottom surface 21d of the main body 21 and the cover 51.

FIGS. 10 and 11 are views illustrating other components housed between the bottom surface 21d of the main body 21 and the cover 51. FIG. 10 is a perspective view of the bottom surface 21d from which the cover 51 is detached as viewed obliquely from below, and FIG. 11 is an exploded perspective view. As illustrated in FIGS. 10 and 11, the optical transceiver 2 of the present embodiment further includes a latch 24 and an elasticity member 25. Further, the slider 22 further includes a slit member 26 made of zinc die-cast. Incidentally, the slit member 26 and the other portions (the bottom plate 22g and the like) of the slider 22 are formed as separate bodies in the present embodiment, but may be fixed to each other to be integrated, or may be integrally molded using the same material.

The slit member 26 has a slit 26a. The slit 26a is an elongated opening that penetrates the slit member 26 in the direction A3, and an extending direction thereof includes a portion inclined in the direction A2 with respect to the fitting and pulling direction A1. A direction of this inclination approaches the cage body 41 as approaching a front end of the optical transceiver 2. The slit member 26 is fit into the substantially rectangular opening 22h (see FIGS. 6A, 6B, 8A, and 8B) formed in the bottom plate 22g of the slider 22 and moves together with the slider 22 along the fitting and pulling direction A1. As illustrated in FIG. 7, a shallow groove 21x guiding the slit member 26 is formed on the bottom surface 21d of the main body 21. A planar shape of the groove 21x is, for example, a substantially rectangular shape. The groove 21x extends along the fitting and pulling direction A1 and is formed between the convex 21g and the convex 21h in a central portion of the bottom surface 21d in the direction A3. Further, a shallow groove 51f for guiding the slit member 26 is also formed in the cover 51 as illustrated in FIG. 9. The groove 51f extends along the fitting and pulling direction A1 while facing the groove 21x and is formed between the convex 51a and the convex 51d in a central portion of the cover 51 in the direction A3.

Figure 12A:
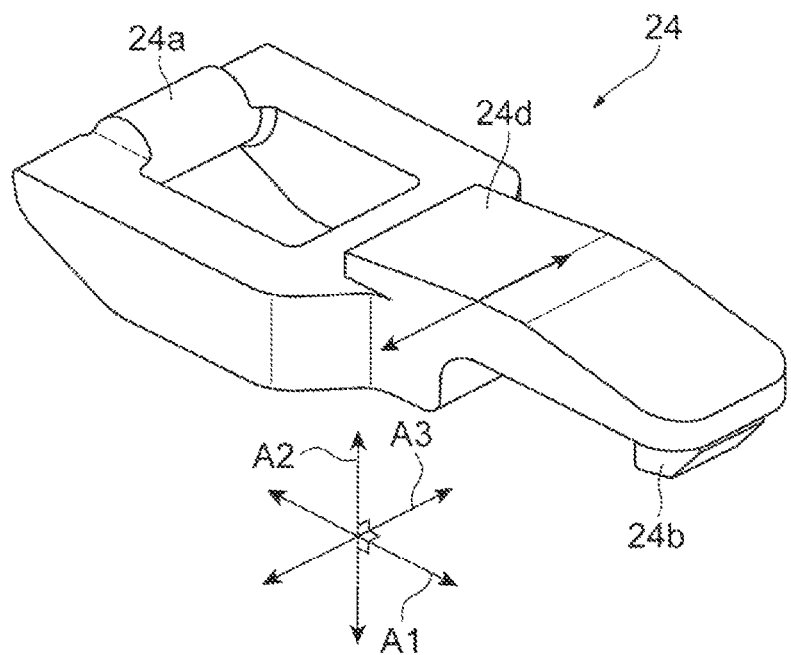
FIGS. 12A and 12B are perspective views illustrating an external appearance of a latch 24.
Figure 12B:
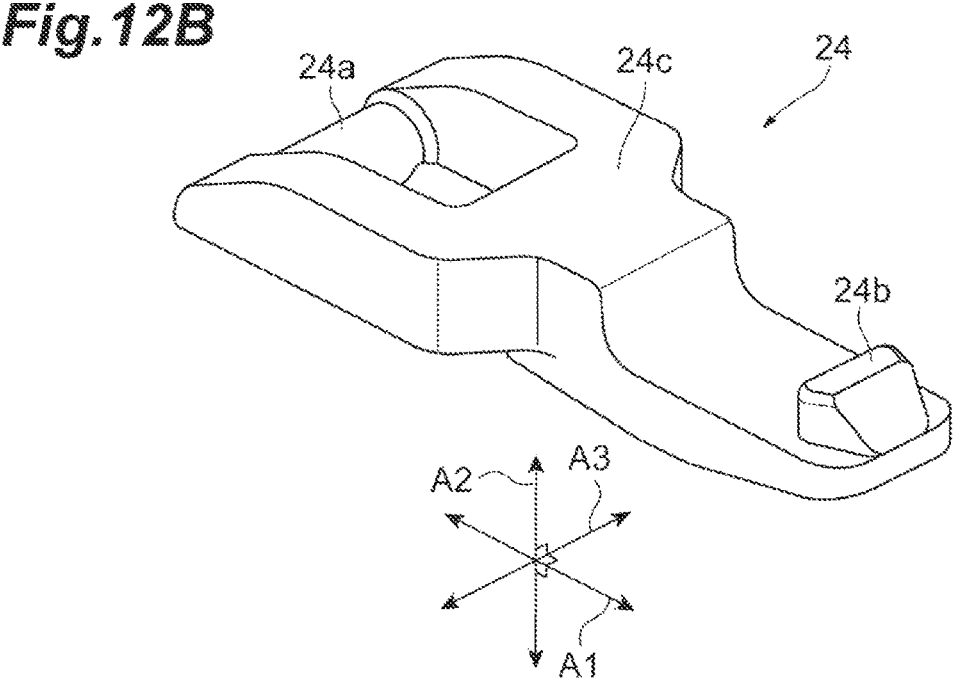

FIGS. 12A and 12B are perspective views illustrating an external appearance of the latch 24. FIG. 12A illustrates the external appearance of the latch 24 as viewed obliquely from above, and FIG. 12B illustrates the external appearance of the latch 24 as viewed obliquely from below. As illustrated in these drawings, the latch 24 has a rocking shaft 24a provided at a rear terminal in the fitting and pulling direction A1 and a projection 24b provided at a front terminal, with the pulling direction A1 as the longitudinal direction. The rocking shaft 24a and the projection 24b are arranged side by side in the fitting and pulling direction A1. The rocking shaft 24a is a columnar portion extending along the direction A3. The projection 24b protrudes in the direction A2 toward a side opposite to the main body 21 (that is, the cage body 41 side illustrated in FIG. 1). The projection 24*b* is engaged with the cage body 41 when the optical transceiver 2 is fit into the cage 4. Further, the latch 24 has a lower face 24*c* and an upper face 24*d*. The lower face 24*c* faces the cover 51, and the upper face 24*d* faces the bottom surface 21*d* of the main body 21. The lower face 24*c* and the upper face 24*d* are flat and intersect the direction A2. The lower face 24*c* and the upper face 24*d* are provided between the rocking shaft 24*a* and the projection 24*b* in the fitting and pulling direction A1.

Figure 13:
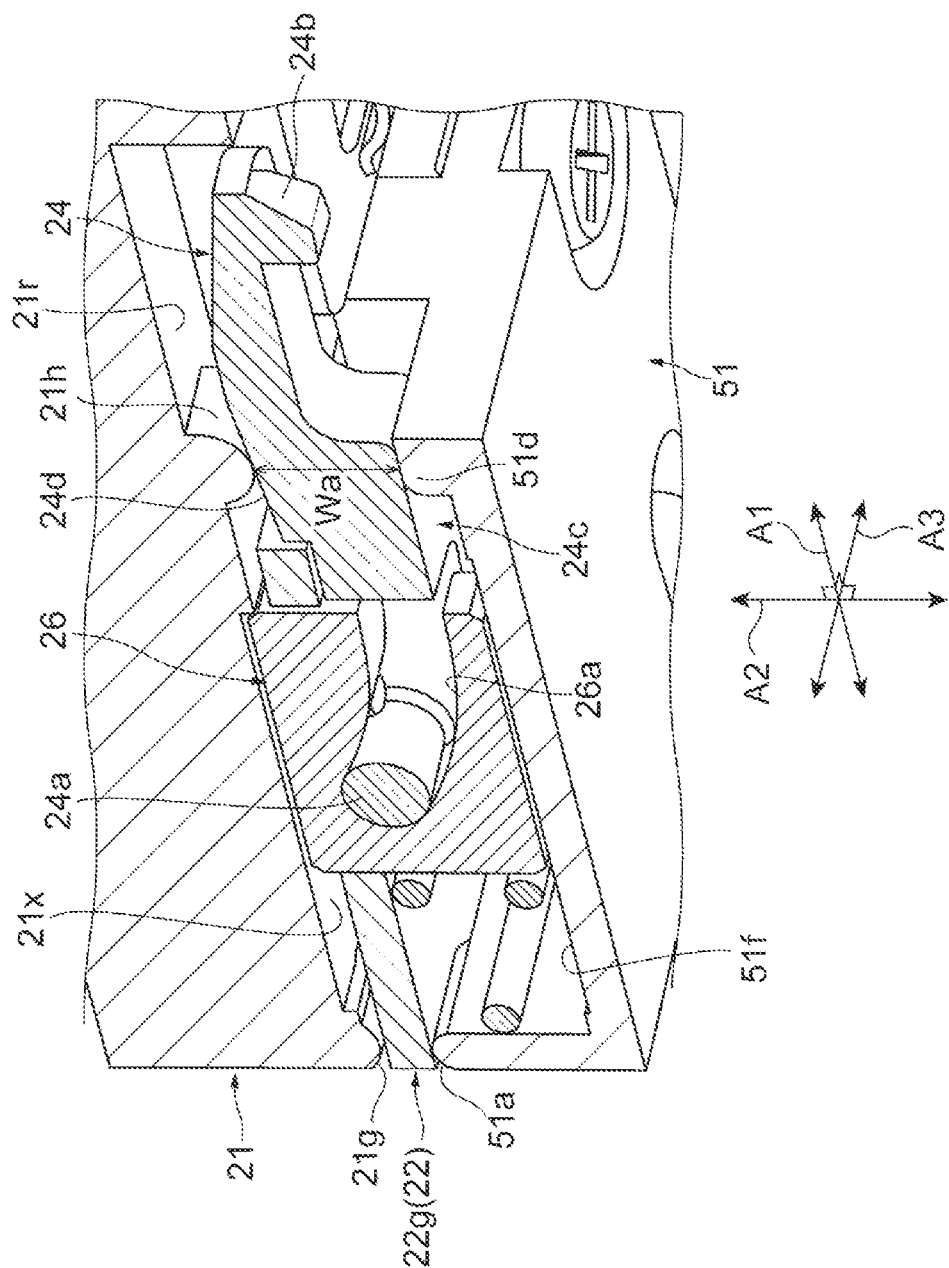
FIG. 13 is a cutaway perspective view illustrating a state where the latch 24 and a slit member 26 are housed between the main body 21 and the cover 51.

FIG. 13 is a cutaway perspective view illustrating a state where the latch 24 and the slit member 26 are housed between the main body 21 and the cover 51. As illustrated in FIG. 13, the rocking shaft 24*a* of the latch 24 is fit into the slit 26*a* of the slit member 26 and moves inside the slit 26*a* along the extending direction of the slit 26*a*. The convex 51*d* of the cover 51 and the convex 21*h* formed on the bottom surface 21*d* of the main body 21 constitute a pair of convexes in the present embodiment and are positioned on both sides of the latch 24 in the direction A2. The lower face 24*c* of the latch 24 contacts the convex 51*d* of the cover 51. The upper face 24*d* of the latch 24 contacts the convex 21*h* formed on the bottom surface 21*d* of the main body 21. As a result, the pair of convexes 51*d* and 21*h* supports the latch 24 in rockable manner within an imaginary plane along the fitting and pulling direction A1 and the direction A2. FIG. 13 illustrates a state where the slider 22 has moved forward. At this time, the projection 24*b* of the latch 24 is lowered to be engaged with the cage body 41.

A width Wa in the direction A2 of a portion of the latch 24 which contacts the pair of convexes 51*d* and 21*h* (that is, the portion sandwiched between the lower face 24*c* and the upper face 24*d*) gradually increases as approaching the projection 24*b*. In other words, the upper face 24*d* is slightly inclined with respect to the lower face 24*c*. Further, surfaces of the pair of convexes 51*d* and 21*h* contacting the latch 24 are curves bent in the cross section taken along the fitting and pulling direction A1 and the direction A2.

Figure 14:
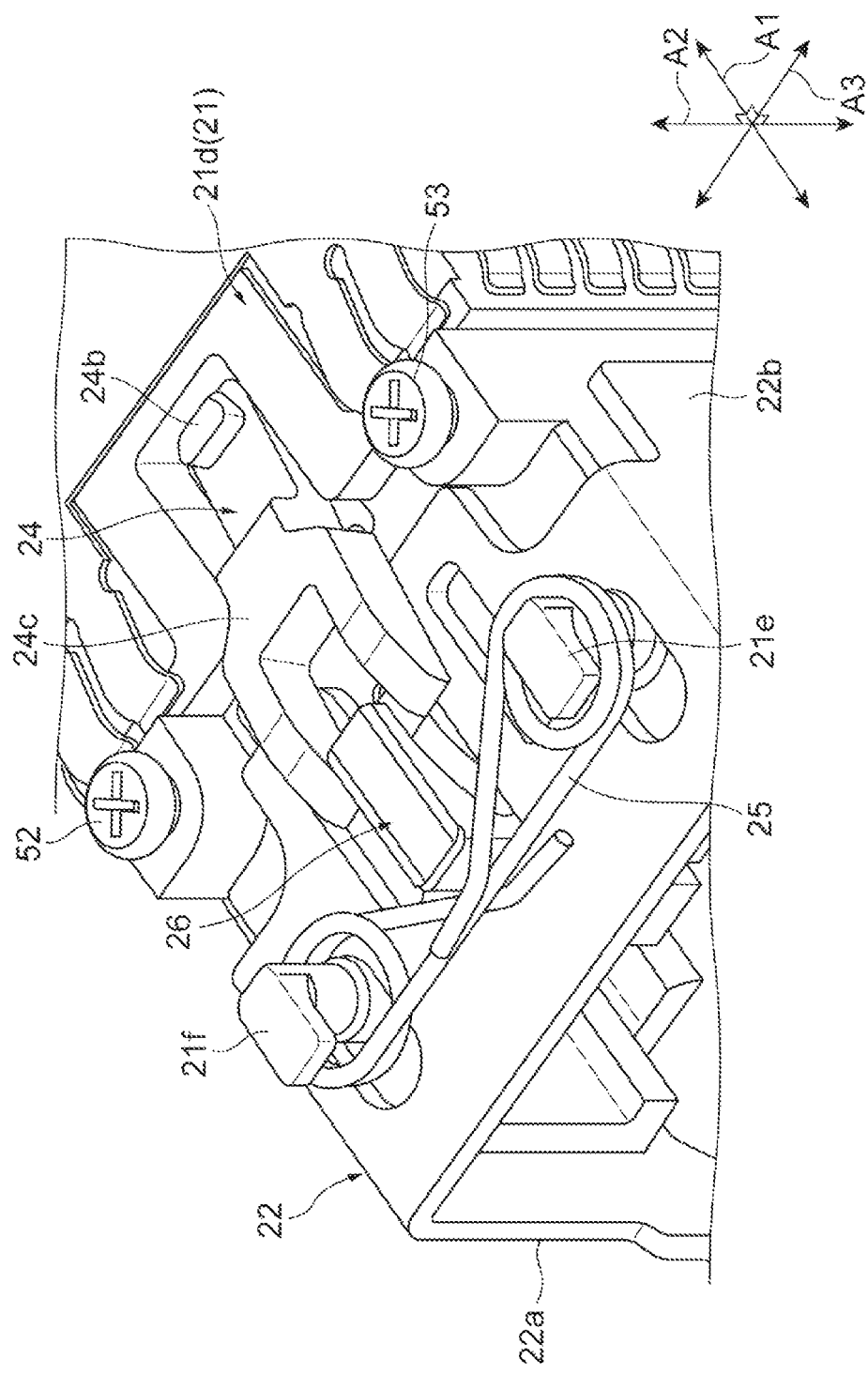
FIG. 14 is a view illustrating a state where the slider 22 has moved backward, and is the perspective view of the bottom surface 21d from which the cover 51 is detached as viewed obliquely from below.
Figure 15:
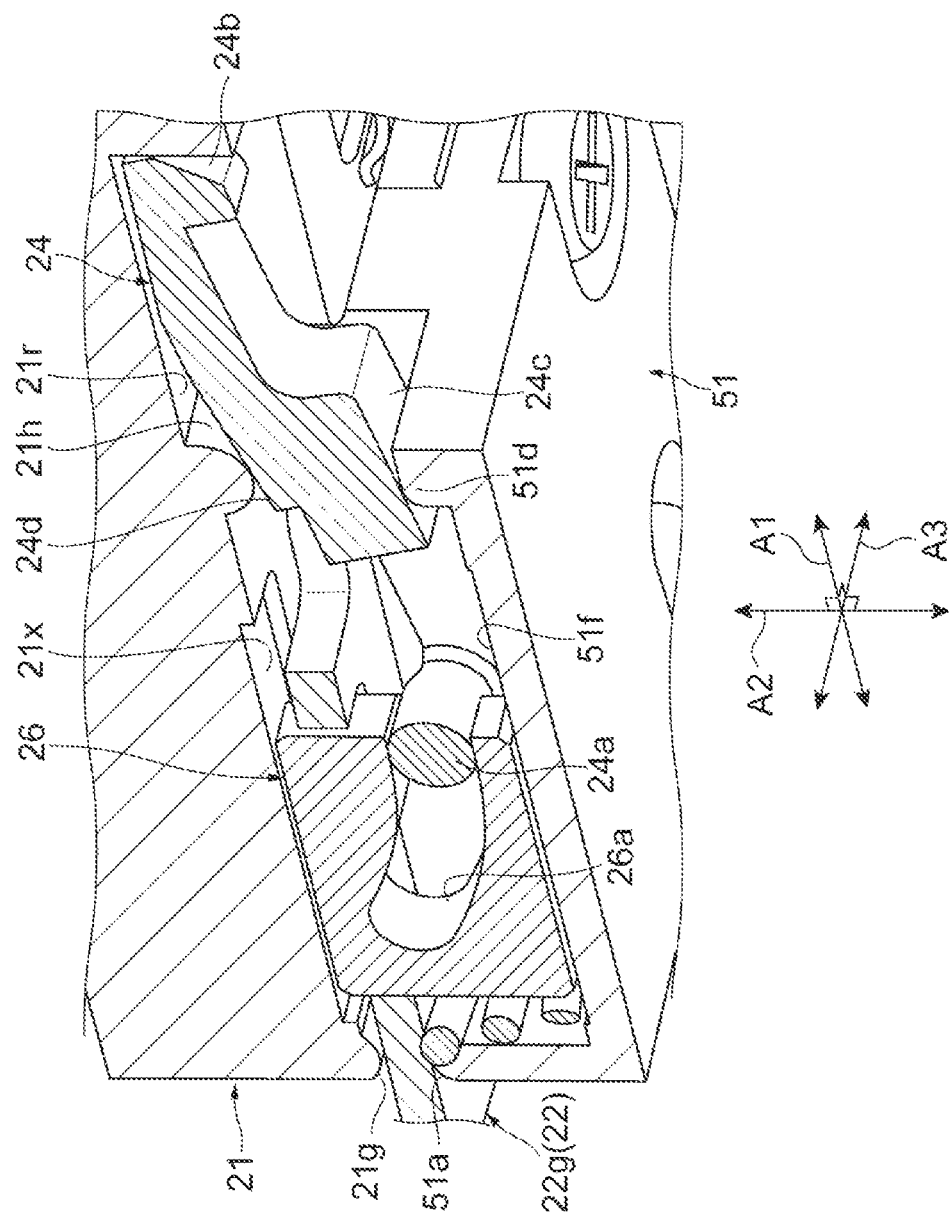
FIG. 15 is a cutaway perspective view illustrating a state where the slider 22 has moved backward.

FIGS. 14 and 15 are views illustrating a state where the slider 22 has moved backward. FIG. 14 is a perspective view of the bottom surface 21*d* from which the cover 51 is detached as viewed obliquely from below, and FIG. 15 is a cutaway perspective view. As illustrated in these drawings, when the slider 22 moves backward, the slit member 26 also moves backward, and thus, the rocking shaft 24*a* relatively moves inside the slit 26*a*. Since the extending direction of the slit 26*a* includes the portion that is inclined in the direction A2 with respect to the fitting and pulling direction A1, the rocking shaft 24*a* moves downward (to the cage body 41 side). At this time, the projection 24*b* is lifted since the movement in the direction A2 is restricted by the pair of convexes 51*d* and 21*h* in the vicinity of a central portion of the latch 24 in the fitting and pulling direction A1. That is, the projection 24*b* moves toward the bottom surface 21*d* of the main body 21, and is housed in the concave 21*r* formed in the bottom surface 21*d*. As a result, the engagement between the projection 24*b* and the cage body 41 is released.

In the present embodiment, the slit member 26 and the slider 22 are formed as separate bodies. Thus, as the slider 22 pushes and pulls the slit member 26 housed in the opening 22*h*, the latch 24 indirectly operates. In this case, since the slider 22 does not directly move the latch 24, the latch operation is hardly affected by an attitude (inclination or the like) of the slider 22.

Here, FIGS. 10 and 11 will be referred to again. The elasticity member 25 is arranged between the bottom surface 21*d* of the main body 21 and the cover 51 and is wound around the projections 21*e* and 21*f* projecting from the bottom surface 21*d* to be restricted in movement. The elasticity member 25 pushes a back terminal of the slit member 26 forward, and biases the slider 22 toward a position of the slider 22 where the projection 24*b* is engaged with the cage body 41 from a position of the slider 22 where the engagement between the projection 24*b* of the latch 24 and the cage body 41 is released. As described above, when the force pulling the pull-tab 23 disappears, the slider 22 automatically moves forward and returns to the original position. The elasticity member 25 of the present embodiment has a shape such as a so-called torsion spring, and has a pair of coils 25*a* and a pair of terminals 25*b* projecting in opposite directions from the respective coils 25*a*. Each of the projections 21*e* and 21*f* is inserted through each of the pair of coils 25*a*. The pair of terminals 25*b* contacts the back terminal of the slit member 26, and biases the slit member 26 forward.

Operational effects that can be obtained by the above-described optical transceiver 2 of the present embodiment will be described. As described above, when a user pulls the pull-tab 23 backward in a state where the optical transceiver 2 is fit into the cage body 41 of the host system, the slider 22 moves backward in the optical transceiver 2 in conjunction with the user's pulling. At this time, the slit 26*a* of the slider 22 also moves backward, and thus, the rocking shaft 24*a* of the latch 24 moves to the outside (the cage body 41 side) of the optical transceiver 2. The latch 24 is supported in a rockable manner by the pair of convexes 21*h* and 51*d* of the housing 20. When the rocking shaft 24*a* of the latch 24 moves to the cage body 41 side, the projection 24*b* of the latch 24 moves to the side opposite to the cage body 41 side (see FIGS. 14 and 15). As a result, the engagement between the projection 24*b* of the latch 24 and the cage body 41 is released. According to such a mechanism, the engagement with the cage body 41 can be released only by linear movement of the slider 22 and rocking of the latch 24, and a large crank as in Japanese Unexamined Patent Publication No. 2014-120481 is not required. Therefore, interference with the optical connector can be suppressed, and it is possible to use the optical transceiver even in a limited space.

As in the present embodiment, the housing 20 may include the cover 51 including one convex 51*d* positioned on the cage body 41 side between the pair of convexes 21*h* and 51*d*, and the main body 21 including the other convex 21*h*, and the main body 21 and the cover 51 may be fixed to each other. In this case, it is possible to easily cause the pair of convexes 21*h* and 51*d* to contact both the sides of the latch 24 by sandwiching the latch 24 between the main body 21 and the cover 51 at the time of assembling the housing 20.

As in the present embodiment, at least the portion of the slider 22 including the slit 26*a* (the slit member 26 and the bottom plate 22*g*) may be arranged between the main body 21 and the cover 51. As a result, the movable slit member 26 and the bottom plate 22*g* can be covered with the cover 51, and it is possible to prevent the optical transceiver 2 from being caught by a structural body (the cage body 41 or the like) outside the optical transceiver 2. Therefore, removal and an abnormal operation of the slider 22 can be reduced.

As in the present embodiment, the optical transceiver 2 may further include the elasticity member 25, and the elasticity member 25 may bias the slider 22 toward the position of the slider 22 where the projection 24*b* is engaged with the cage body 41 from the position of the slider 22 where the engagement between the projection 24*b* of the latch 24 and the cage body 41 is released. As a result, it is possible to prevent unintentional release of the engagement between the projection 24b of the latch 24 and the cage body 41.

As in the present embodiment, the surfaces of the pair of convexes 21h and 51d which contact the latch 24 may be curves bent in the cross section taken along the fitting and pulling direction A1 and the direction A2. Thus, the rocking motion of the latch 24 can be made smoother.

Figure 16:
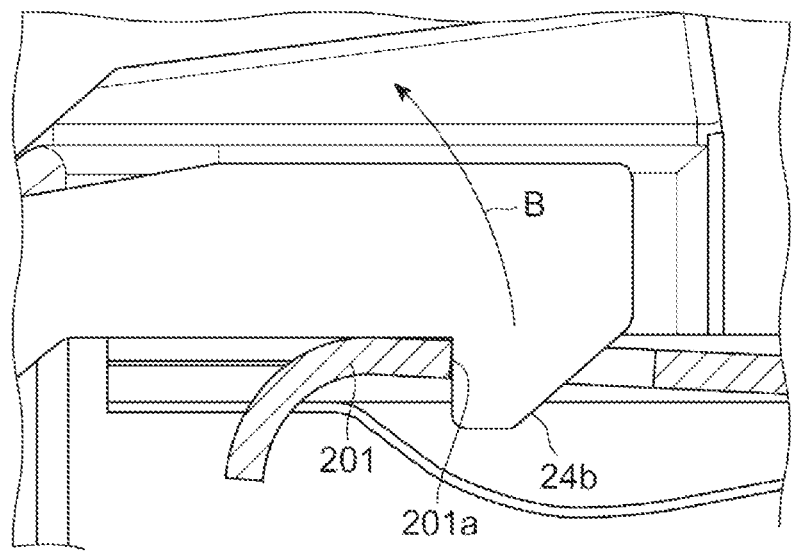
FIG. 16 is a cross-sectional view illustrating a state where a projection 24b of the latch 24 and an edge 201a of an opening formed in a latch mechanism 201 of a cage body 41 are engaged.

Here, another operational effect that can be obtained by the optical transceiver 2 of the present embodiment will be described. FIG. 16 is a cross-sectional view illustrating a state where the projection 24b of the latch 24 and an edge 201a of an opening formed in a latch mechanism 201 of the cage body 41 are engaged. If the projection 24b lifts obliquely to the back side as indicated by an arrow B in the drawing when this engagement is released, there is a risk that a back terminal of the projection 24b is caught on the edge 201a and the projection 24b does not lift smoothly. Therefore, there is a risk that the optical transceiver 2 is not removed from the cage body 41.

Figure 17:
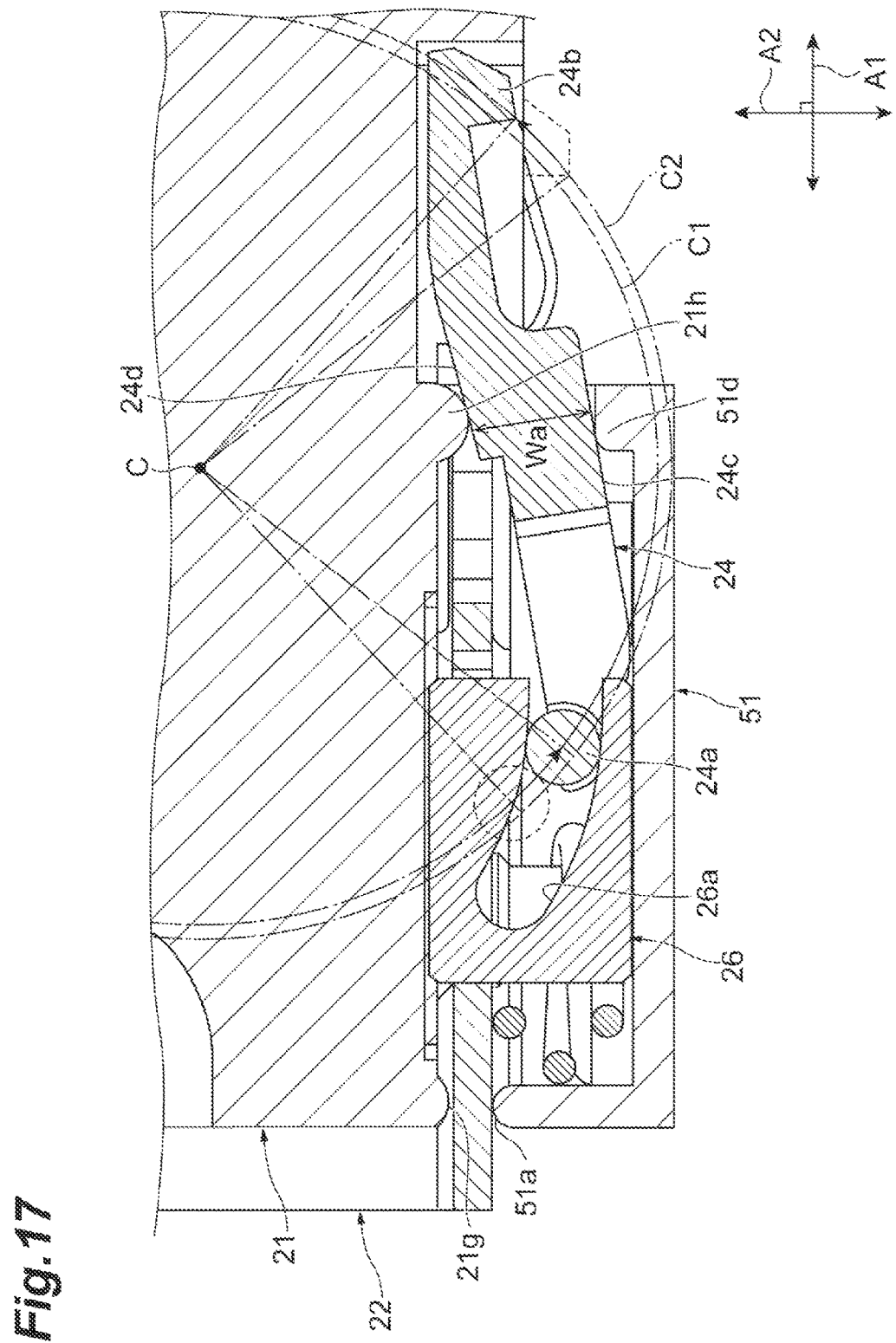
FIG. 17 is a cross-sectional view illustrating a rocking motion of the latch 24, and illustrates a cross section of the latch 24 and the slit member 26 taken along a fitting and pulling direction A1 and a direction A2.

FIG. 17 is a cross-sectional view illustrating a rocking motion of the latch 24 of the present embodiment, and illustrates a cross section of the latch 24 and the slit member 26 taken along the fitting and pulling direction A1 and the direction A2. As illustrated in FIG. 17, the center axis of the slit 26a is bent in the present embodiment, and a center of curvature of the center axis is positioned on the opposite side (the main body 21 side) of the cage body 41 side (that is, the cover 51 side). Therefore, the bending of the slit 26a becomes convex toward the cage body 41. In addition, the width Wa in the direction A2 of the portion of the latch 24 which contacts the pair of convexes 51d and 21h gradually increases as approaching the projection 24b as described above. Furthermore, the latch 24 is not fixed to the main body 21 and the cover 51, but is merely supported in a slidable manner by the pair of convexes 51d and 21h. In such a configuration, a rocking center of the latch 24 of the present embodiment is a point C in the drawing. The point C is positioned outside the latch 24 and is positioned on the opposite side of the cage body 41 with respect to the latch 24. In such a configuration, when the engagement between the projection 24b and the cage body 41 is released, the rocking shaft 24a moves on an arc C1 having the point C as a center, and the projection 24b moves on an arc C2 having the point C as a center. Therefore, the projection 24b moves in a direction inclined to the front side rather than the back side with respect to the direction A2. In this manner, the movement direction of the projection 24b becomes the direction obliquely away from the cage body 41 when the engagement is released, and thus, it is possible to prevent the stuck between the projection 24b and the cage body 41 at the time of releasing the engagement, and it is possible to reduce the risk that the optical transceiver 2 is not removed from the cage body 41.

As in the present embodiment, the slit 26a may be bent, and the center of curvature thereof may be positioned on the side opposite to the cage body 41 side. As a result, it becomes easier for the rocking center (point C) of the latch 24 to be positioned on the opposite side of the cage body 41 with respect to the latch 24, and the direction of movement of the projection 24b can be set to the direction that is obliquely away from the cage body 41 when releasing the engagement. Therefore, it is possible to reduce the stuck between the projection 24b and the cage body 41 when releasing the engagement.

As in the present embodiment, the width Wa of the latch 24 may gradually increase as approaching the projection 24b. As a result, it becomes easier for the rocking center (point C) of the latch 24 to be positioned on the opposite side of the cage body 41 with respect to the latch 24, and the direction of movement of the projection 24b can be set to the direction that is obliquely away from the cage body 41 when releasing the engagement. Therefore, it is possible to reduce the stuck between the projection 24b and the cage body 41 when releasing the engagement.

(First Modification)

Figure 18:
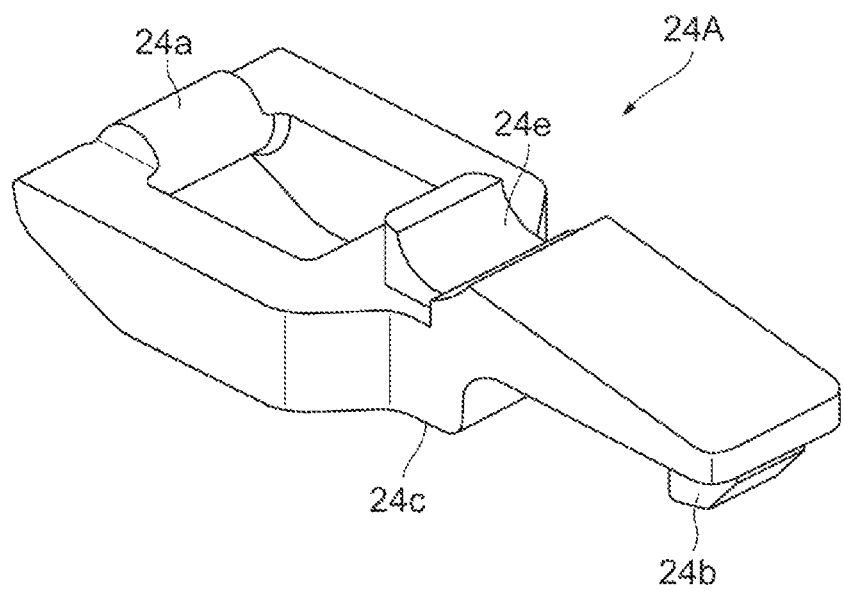
FIG. 18 is a perspective view illustrating an external appearance of a latch 24A according to a first modification.

FIG. 18 is a perspective view illustrating an external appearance of a latch 24A according to a first modification of the above-described embodiment. As illustrated in FIG. 18, the latch 24A of the present modification has a concave 24e instead of the flat upper face 24d of the above-described embodiment. The concave 24e is formed on a surface on the opposite side of the lower face 24c (that is, the surface on the opposite side of the cage body 41). The concave 24e extends along the direction A3. The other configurations of the latch 24A are similar to those of the latch 24 of the above-described embodiment.

Figure 19:
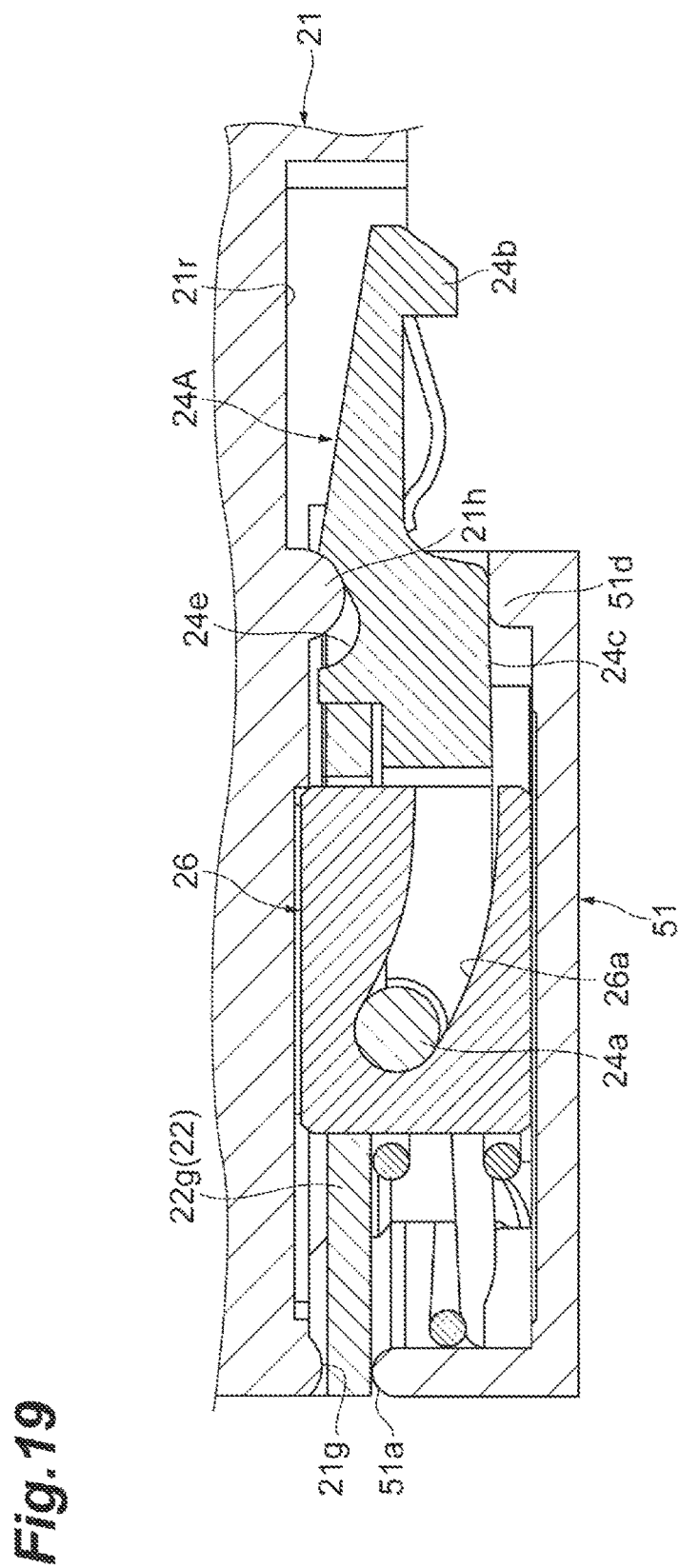
FIG. 19 is a cross-sectional view illustrating a state where the latch 24A is housed between the main body 21 and the cover 51, and illustrates the state where the slider 22 has moved forward.
Figure 20:
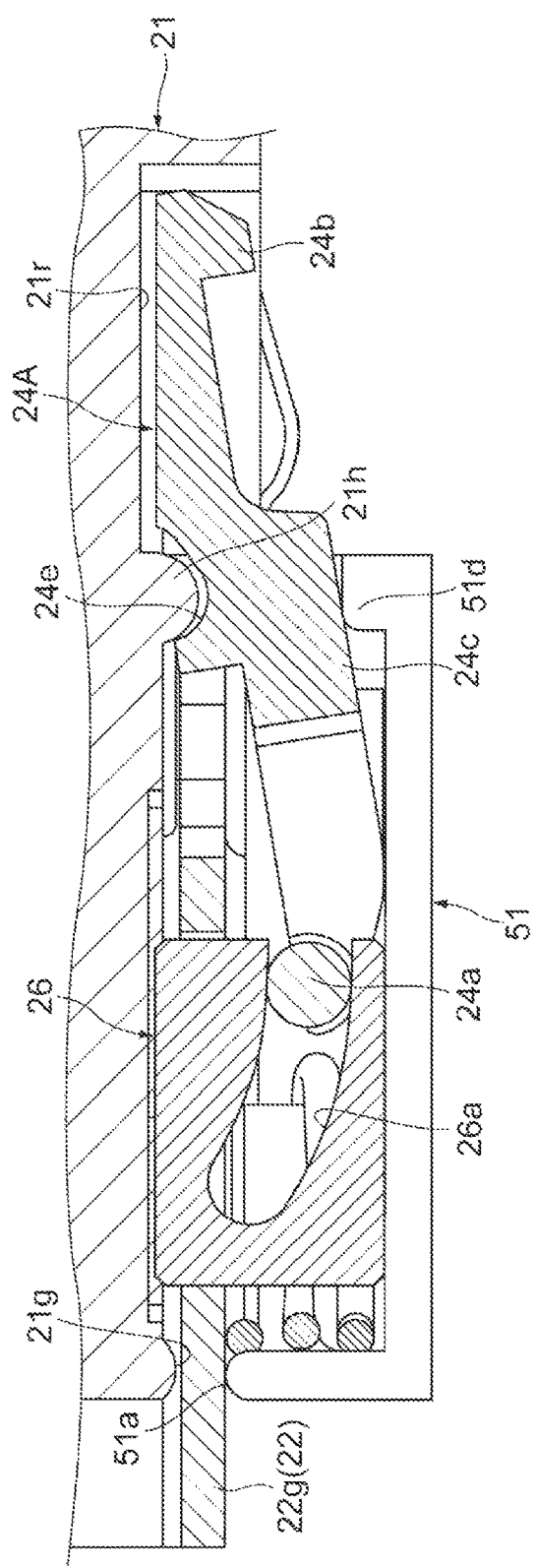
FIG. 20 is a cross-sectional view illustrating a state where the latch 24A is housed between the main body 21 and the cover 51, and illustrates the state where the slider 22 has moved backward.

FIGS. 19 and 20 are cross-sectional views illustrating states where the latch 24A is housed between the main body 21 and the cover 51. FIG. 19 illustrates a state where the slider 22 has moved forward (that is, a state where the projection 24b is engaged with the cage body 41), and FIG. 20 illustrates a state where the slider 22 has moved backward (that is, a state where the engagement between the projection 24b and the cage body 41 is released). As illustrated in these drawings, the concave 24e houses the convex 21h positioned on the opposite side of the cage body 41 side between the pair of convexes 21h and 51d, and contacts the convex 21h on an inner surface thereof. A shape of the inner surface of the concave 24e in a cross section taken along the fitting and pulling direction A1 and the direction A2 is a part of an ellipse whose long axis is inclined with respect to the fitting and pulling direction A1. That is, a gap is provided between the concave 24e and the convex 21h in the fitting and pulling direction A1. This gap defines a movable range of the latch 24A relative to the housing 20 in the fitting and pulling direction A1.

As in the present modification, the latch 24A may have the concave 24e formed on the surface on the opposite side of the cage body 41, and the concave 24e may house the convex 21h and contact the convex 21h on the inner surface thereof. As a result, excessive movement of the latch 24A with respect to the housing 20 in the fitting and pulling direction A1 is restricted, and the latch 24A can be stably retained at a predetermined position. In this case, the gap between the concave 24e and the convex 21h in the fitting and pulling direction A1 may define the movable range of the latch 24A in the direction. Thus, the latch 24A can be stably retained within the predetermined movable range.

(Second Modification)

Figure 21:
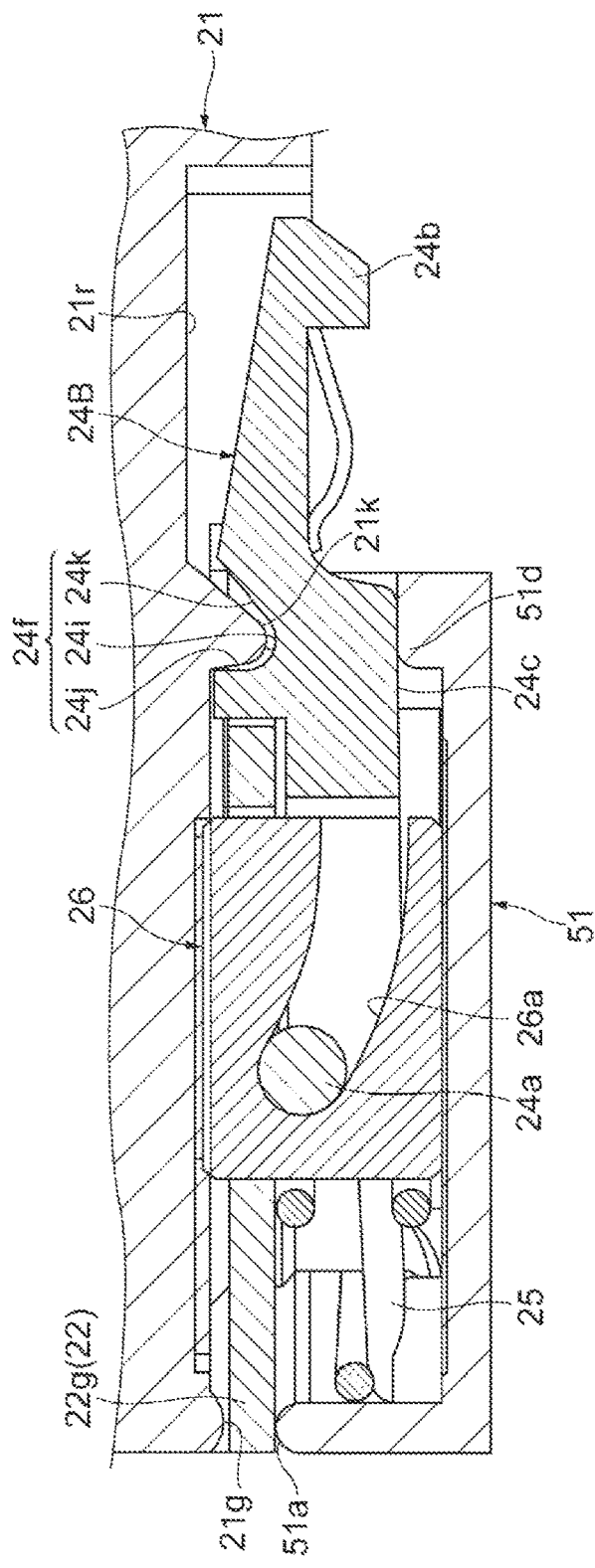
FIG. 21 is a cross-sectional view illustrating a state where a latch 24B according to a second modification is housed between the main body 21 and the cover 51, and illustrates the state where the slider 22 has moved forward.
Figure 22:
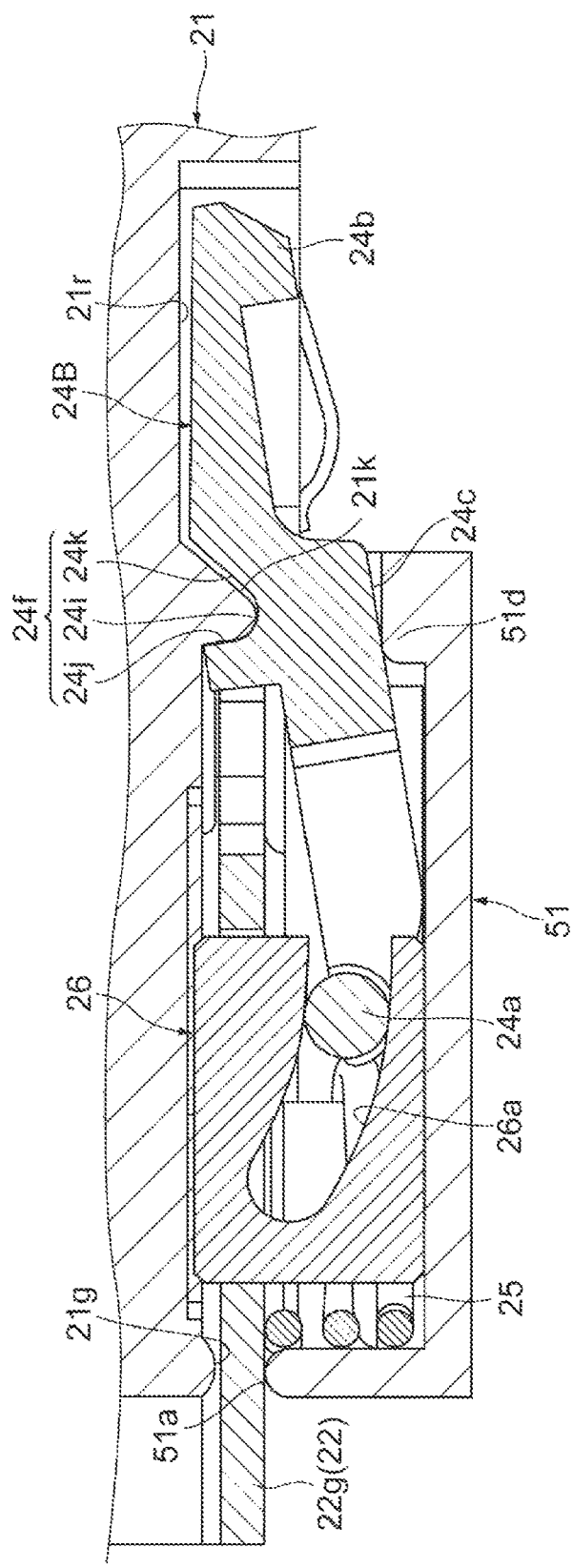
FIG. 22 is a cross-sectional view illustrating a state where a latch 24B according to a second modification is housed between the main body 21 and the cover 51, and illustrates the state where the slider 22 has moved backward.

FIGS. 21 and 22 are cross-sectional views illustrating states where a latch 24B according to a second modification is housed between the main body 21 and the cover 51. FIG. 21 illustrates a state where the slider 22 has moved forward (that is, a state where the projection 24b is engaged with the cage body 41), and FIG. 22 illustrates a state where the slider 22 has moved backward (that is, a state where the engagement between the projection 24b and the cage body 41 is released). The latch 24B of the present modification has a concave 24f instead of the flat upper face 24d of the above-described embodiment, which is similar to the latch 24A according to the first modification. The concave 24f is formed on a surface on the opposite side of the lower face 24c (that is, the surface on the opposite side of the cage body 41). The concave 24f extends along the direction A3. The other configurations of the latch 24B are similar to those of the latch 24 of the above-described embodiment.

However, a cross-sectional shape of the concave 24f of the present modification is different from a cross-sectional shape of the concave 24e of the first modification. That is, a shape of an inner surface of the concave 24f in a cross section taken along the fitting and pulling direction A1 and the direction A2 includes each flatness 24j and 24k and a curve 24i. The flatness 24j extends in the direction A2 from an edge of a rear end of the concave 24f toward the lower face 24c. The flatness 24k extends along a direction inclined with respect to the direction A2 from an edge of a front end of the concave 24f toward the lower face 24c. The curve 24i has a shape such as an inner surface of a semi-cylinder, and connects the flatness 24j and the flatness 24k to each other.

The main body 21 of the present embodiment has a convex 21k instead of the convex 21h of the above-described embodiment. The convex 21k is provided at the same position as the convex 21h and extends along the direction A3 in the same manner as the convex 21h. However, a cross-sectional shape of the convex 21k in the cross section taken along the fitting and pulling direction A1 and the direction A2 is not a semi-cylindrical shape like the convex 21h but has a shape fitting to the above-described concave 24f.

Figure 23:
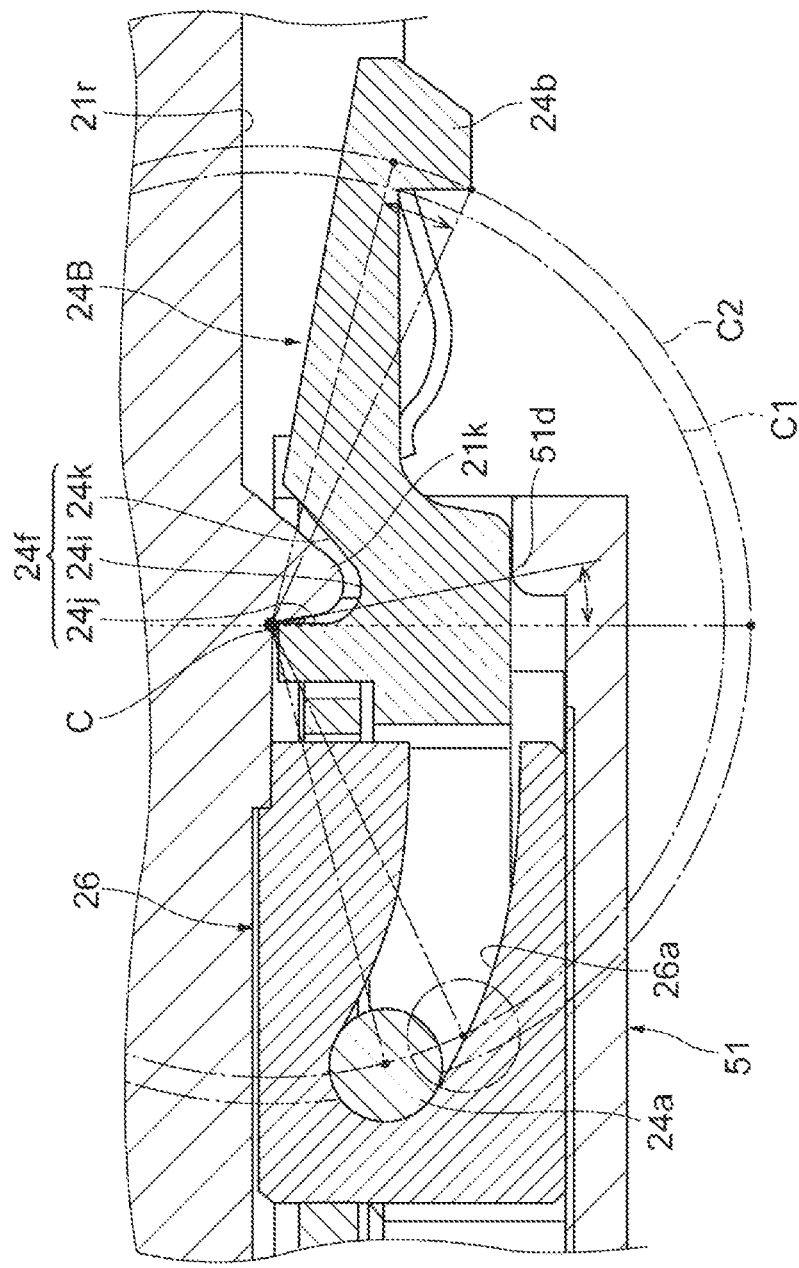
FIG. 23 is a cross-sectional view illustrating a rocking motion of the latch 24B according to the second modification, and illustrates a cross section of the latch 24B and a slit member 26 taken along the fitting and pulling direction A1 and the direction A2.

FIG. 23 is a cross-sectional view illustrating a rocking motion of the latch 24B according to the present modification, and illustrates a cross section of the latch 24B and a slit member 26 taken along the fitting and pulling direction A1 and the direction A2. As illustrated in FIG. 23, the latch 24B contacts the convex 21k of the main body 21 at an edge on the rocking shaft 24a side of the inner surface of the concave 24f. Then, the latch 24B rocks about the edge on the rocking shaft 24a side of the concave 24f. That is, a center C of the latch 24B is positioned on the edge on the rocking shaft 24a side of the concave 24f in the present modification. Further, when the engagement between the projection 24b and the cage body 41 is released, the rocking shaft 24a moves on the arc C1 having the point C as the center, and the projection 24b moves on the arc C2 having the point C as the center. Therefore, the projection 24b moves in a direction inclined forward with respect to the direction A2. In this manner, the movement direction of the projection 24b becomes the direction obliquely away from the cage body 41 when the engagement is released, and thus, it is possible to prevent the stuck between the projection 24b and the cage body 41 at the time of releasing the engagement, and it is possible to reduce the risk that the optical transceiver 2 is not removed from the cage body 41.

Further, the latch 24B of the present modification has the concave 24f formed on the surface on the opposite side of the cage body 41, and the concave 24f houses the convex 21k and contacts the convex 21k on the inner surface thereof as described above. As a result, excessive movement of the latch 24B with respect to the housing 20 in the fitting and pulling direction A1 is restricted, and the latch 24B can be stably retained at a predetermined position.

(Third Modification)

Figure 24:
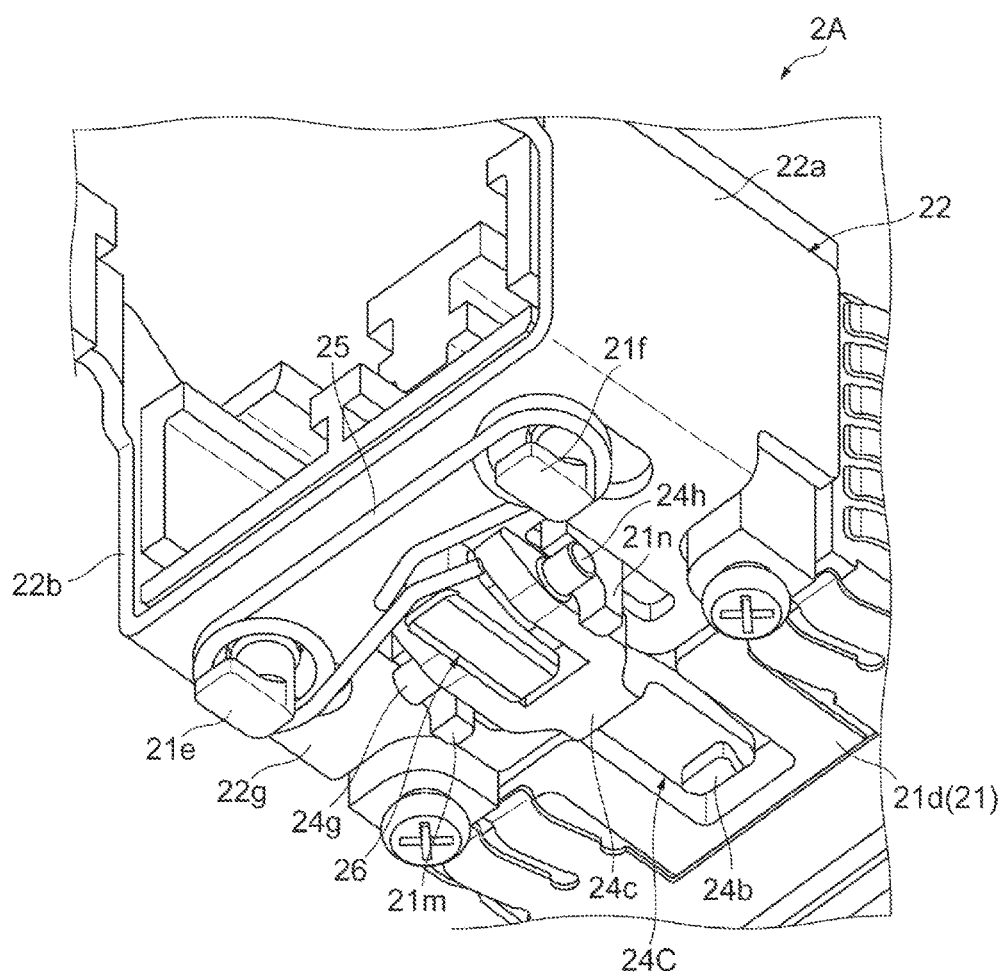
FIG. 24 is an enlarged view illustrating a part of an optical transceiver 2A according to a third modification, and is a perspective view of the bottom surface 21d from which the cover 51 is detached as viewed obliquely from below.
Figure 25:
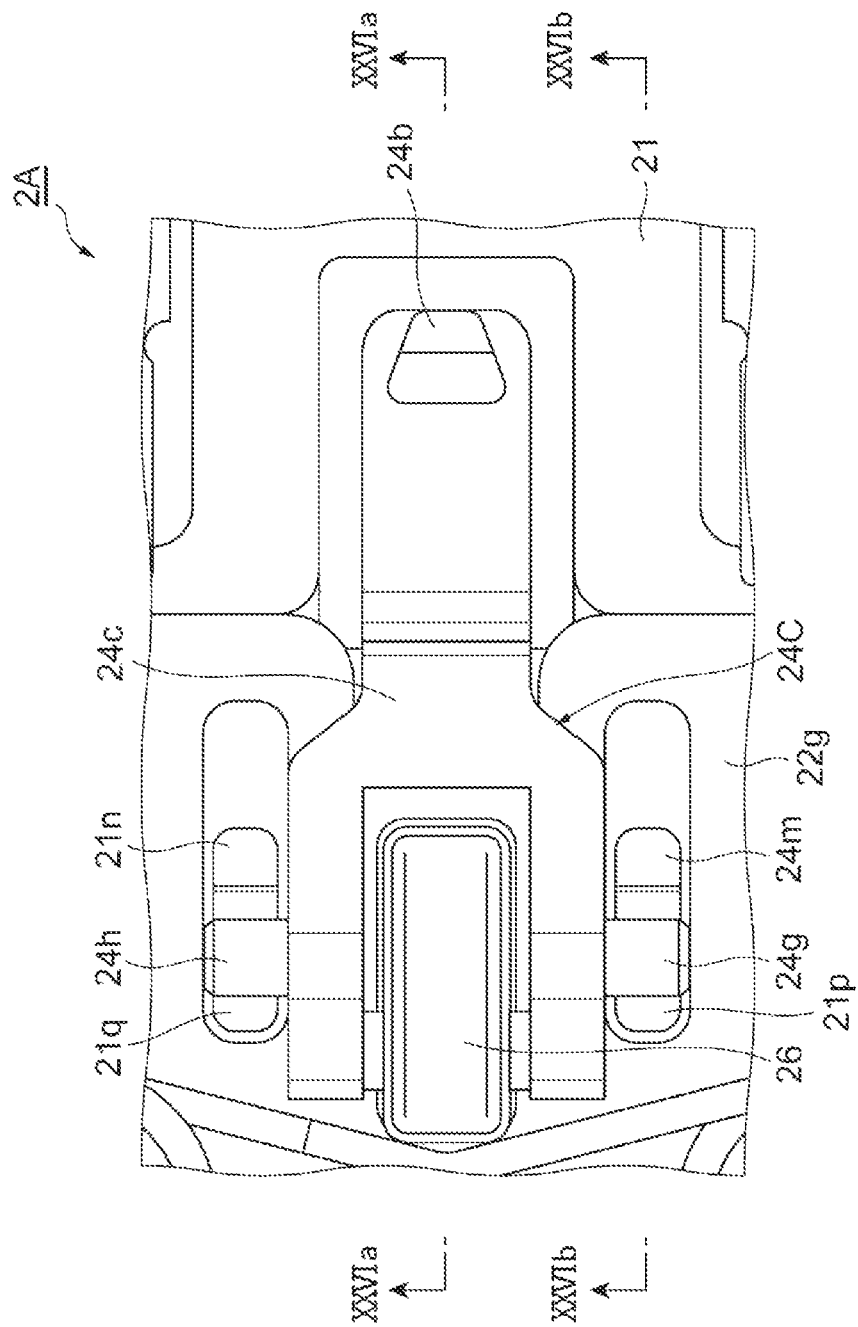
FIG. 25 is an enlarged view illustrating a part of the optical transceiver 2A according to the third modification, and is a bottom view of the optical transceiver 2A from which the cover 51 is detached.

FIGS. 24 to 27B are enlarged views illustrating a part of an optical transceiver 2A according to a third modification of the above-described embodiment. FIG. 24 is a perspective view of the bottom surface 21d from which the cover 51 is detached as viewed obliquely from below, and FIG. 25 is a bottom view thereof. FIG. 26A is a cross-sectional view taken along line XXVIa-XXVIa of FIG. 25, and FIG. 26B is a cross-sectional view taken along line XXVIb-XXVIb of FIG. 25. FIGS. 26A and 26B illustrate a state where the slider 22 has moved forward. FIGS. 27A and 27B are cross-sectional views illustrating a state where the slider 22 has moved backward. FIG. 27A illustrates the same cross section as that of FIG. 26A, and FIG. 27B illustrates the same cross section as that of FIG. 26B.

As illustrated in FIGS. 24 and 25, projections 21m and 21n are formed on the bottom surface 21d of the main body 21 in the optical transceiver 2A of the present modification. The projections 21m and 21n are provided to be aligned along the direction A3 with a central axis of the bottom surface 21d interposed therebetween. The projections 21m and 21n have concaves 21p and 21q, respectively. Further, the cover 51 has a concave 51e facing the concave 21p and a concave (not illustrated) having the same shape as that of the concave 51e and facing the concave 21q as illustrated in FIGS. 26A and 26B. As the concave 51e and the concave 21p are combined with each other, a slit 61 different from the slit 26a is formed. Similarly, a slit (not illustrated) different from the slit 26a is formed as the other concave of the cover 51 and the concave 21q are combined with each other.

The slit 61 includes a portion that is inclined in the direction A2 with respect to the fitting and pulling direction A1. In the present embodiment, the entire slit 61 is inclined with respect to the fitting and pulling direction A1. A direction of this inclination is the same as that of the slit 26a (see FIG. 11), and approaches the cage body 41 as approaching a front end of the optical transceiver 2A. However, an extending direction of the slit 61 is linear, and is not bent like the slit 26a. Further, an inclination angle of the slit 61 with respect to the fitting and pulling direction A1 is larger than an inclination angle of the slit 26a with respect to the same direction. Furthermore, a length of the slit 61 is shorter than that of the slit 26a. The other slit formed by combining the other concave of the cover 51 and the concave 21q with each other also has the same shape as that of the slit 61.

As illustrated in FIG. 24, the optical transceiver 2A of the present modification is provided with a latch 24C instead of the latch 24 of the above-described embodiment. The latch 24C further includes shafts 24g and 24h in addition to the configuration of the latch 24 of the above-described embodiment. The shafts 24g and 24h are shafts different from the rocking shaft 24a. The shafts 24g and 24h are provided between a portion (that is, the lower face 24c and the upper face 24d) contacting the pair of convexes 21h and 51d and the rocking shaft 24a in the fitting and pulling direction A1. The shafts 24g and 24h are positioned on one axis extending along the direction A3 and each have a columnar shape with the one axis as a center line. The shaft 24g is fit into the above-described slit 61 and relatively moves inside the slit 61. The shaft 24h is fit into the other slit and relatively moves inside the slit.

As in the present modification, the housing 20 may further include the slit 61 that is inclined in the direction A2 with respect to the fitting and pulling direction A1, and the latch 24C may further include the shaft 24g which is provided between the portion that contacts the pair of convexes 21h and 51d in the fitting and pulling direction A1 and the rocking shaft 24a and moves inside the slit 61. As a result, it is possible to further stabilize the rocking motion of the latch 24C. Further, the slit 61 may be configured by combining the concave 21p formed in the main body 21 and the concave 51e formed in the cover 51 with each other as in the present modification. As a result, the shaft 24g can be easily housed in the slit 61 when assembling the housing 20.

(Fourth Modification)

Figure 28A:
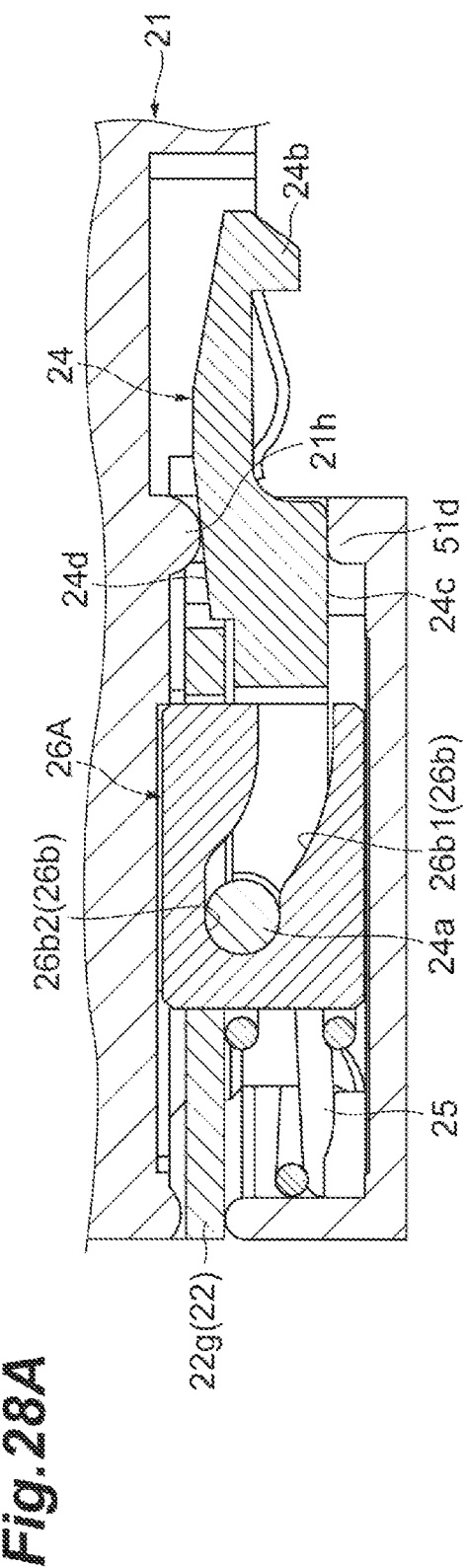
FIGS. 28A and 28B are cross-sectional views illustrating a slit member 26A and a peripheral structure thereof according to a fourth modification.
Figure 28B:
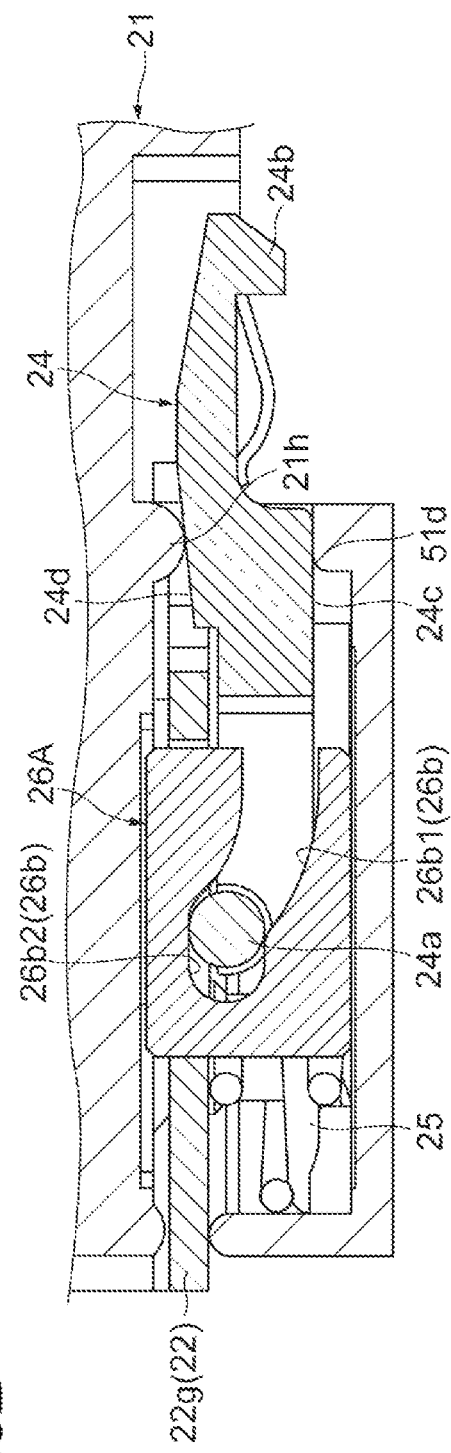

FIGS. 28A and 28B are cross-sectional views illustrating a slit member 26A and a peripheral structure thereof according to a fourth modification of the above-described embodiment. FIG. 28A illustrates a state where the slider 22 has moved forward, and FIG. 28B illustrates a state where a position of the slider 22 has slightly varied from FIG. 28A. As illustrated in these drawings, the slit member 26A of the present modification has a slit 26b instead of the slit 26a of the above-described embodiment. The slit 26b includes a portion 26b1 and a portion 26b2. The portion 26b1 is a portion having the same shape as that of the slit 26a of the above-described embodiment, and is inclined with respect to the fitting and pulling direction A1. The portion 26b2 is connected to a front end (rear end) of the portion 26b1, and an extending direction thereof extends along the fitting and pulling direction A1.

In the present modification, the rocking shaft 24a of the latch 24 moves only in the portion 26b2 of the slit 26b and the latch 24 does not rock even when the slider 22 has moved backward if the movement is small (FIG. 28B). When a movement distance of the slider 22 exceeds a length of the portion 26b2, the rocking shaft 24a moves in the portion 26b1. In this case, the engagement between the projection 24b and the cage body 41 is released by the rocking of the latch 24.

As in the present modification, the slit 26b may have the portion 26b2 which is connected to the front end of the portion 26b1 inclined with respect to the fitting and pulling direction A1 and extends along the fitting and pulling direction A1. As a result, the latch 24 does not rock when the movement of the slider 22 is slight. Therefore, it is possible to suppress the unintentional release of engagement between the optical transceiver 2 and the cage body 41.

(Fifth Modification)

Figure 29:
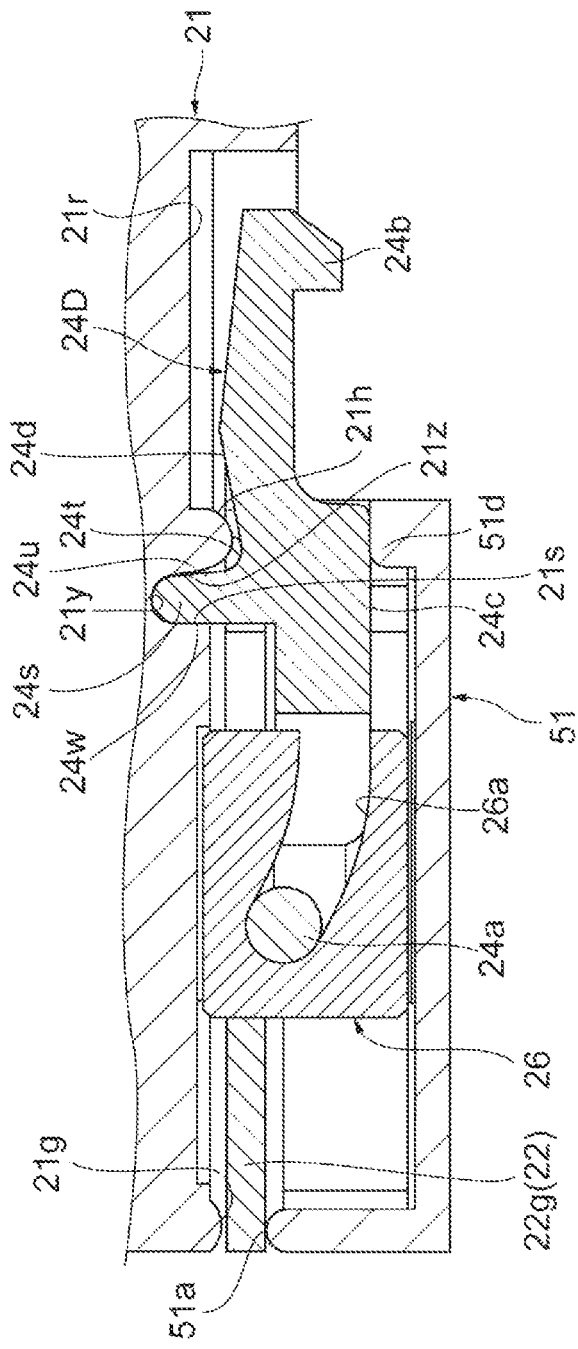
FIG. 29 is a cross-sectional view illustrating a state where a latch 24D according to a fifth modification is housed between the main body 21 and the cover 51, and illustrates the state where the slider 22 has moved forward.
Figure 30:
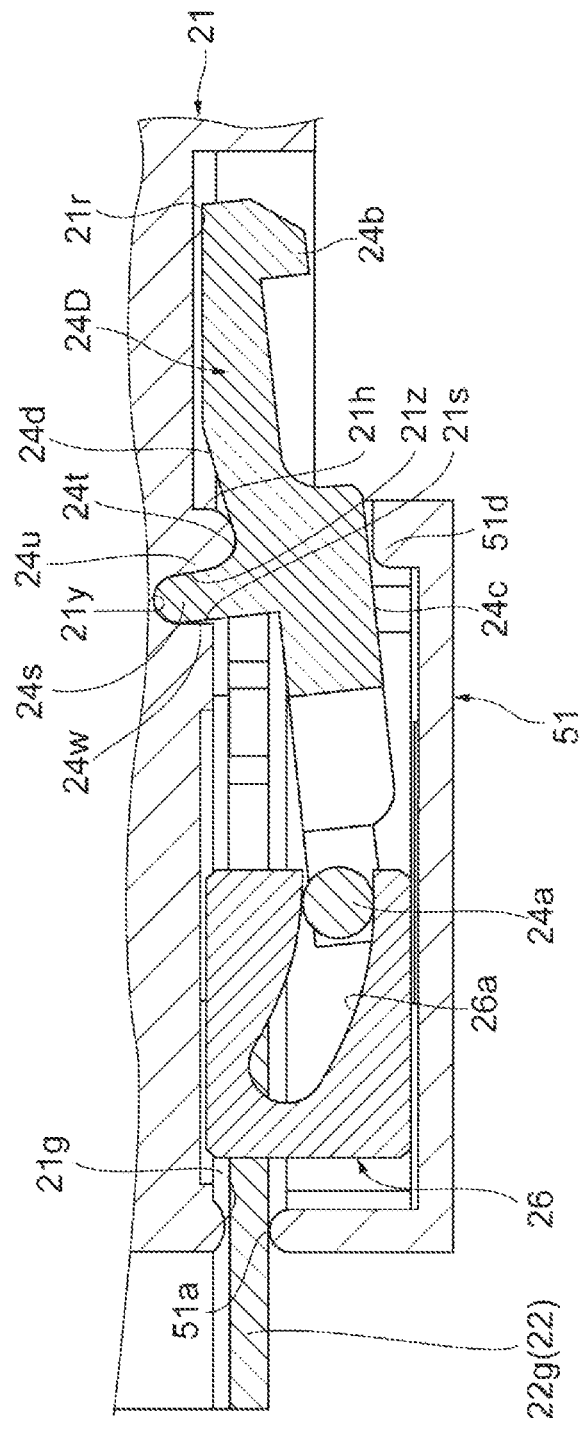
FIG. 30 is a cross-sectional view illustrating a state where the latch 24D according to the fifth modification is housed between the main body 21 and the cover 51, and illustrates the state where the slider 22 has moved backward.

FIGS. 29 and 30 are cross-sectional views illustrating states where a latch 24D according to a fifth modification is housed between the main body 21 and the cover 51. FIG. 29 illustrates a state where the slider 22 has moved forward (that is, a state where the projection 24b is engaged with the cage body 41), and FIG. 30 illustrates a state where the slider 22 has moved backward (that is, a state where the engagement between the projection 24b and the cage body 41 is released). The latch 24D of the present modification has a convex 24s formed on the upper face 24d. The convex 24s extends along the direction A3 and protrudes toward the main body 21 of the housing 20. A boundary 24t between the convex 24s and the upper face 24d is a smoothly concave curve, and corresponds to a portion of an inner surface of a cylinder having a constant radius of curvature in one example. A distal end of the convex 24s is a smoothly convex curve, and corresponds to a portion (semi-cylindrical surface) of a cylindrical surface having a constant radius of curvature in one example. The other configurations of the latch 24D are similar to those of the latch 24 of the above-described embodiment.

In the present modification, a concave 21y housing the convex 24s is formed on the bottom surface 21d of the main body 21. The concave 21y is provided to be adjacent to the convex 21h on the back side (the rocking shaft 24a side) of the convex 21h, and the convex 21h and the concave 21y are smoothly connected by a wall 21z. A front terminal 24u of the convex 24s contacts the wall 21z. Further, the concave 21y has a back wall 21s, and a back terminal 24w of the convex 24s contacts the back wall 21s.

Figure 31:
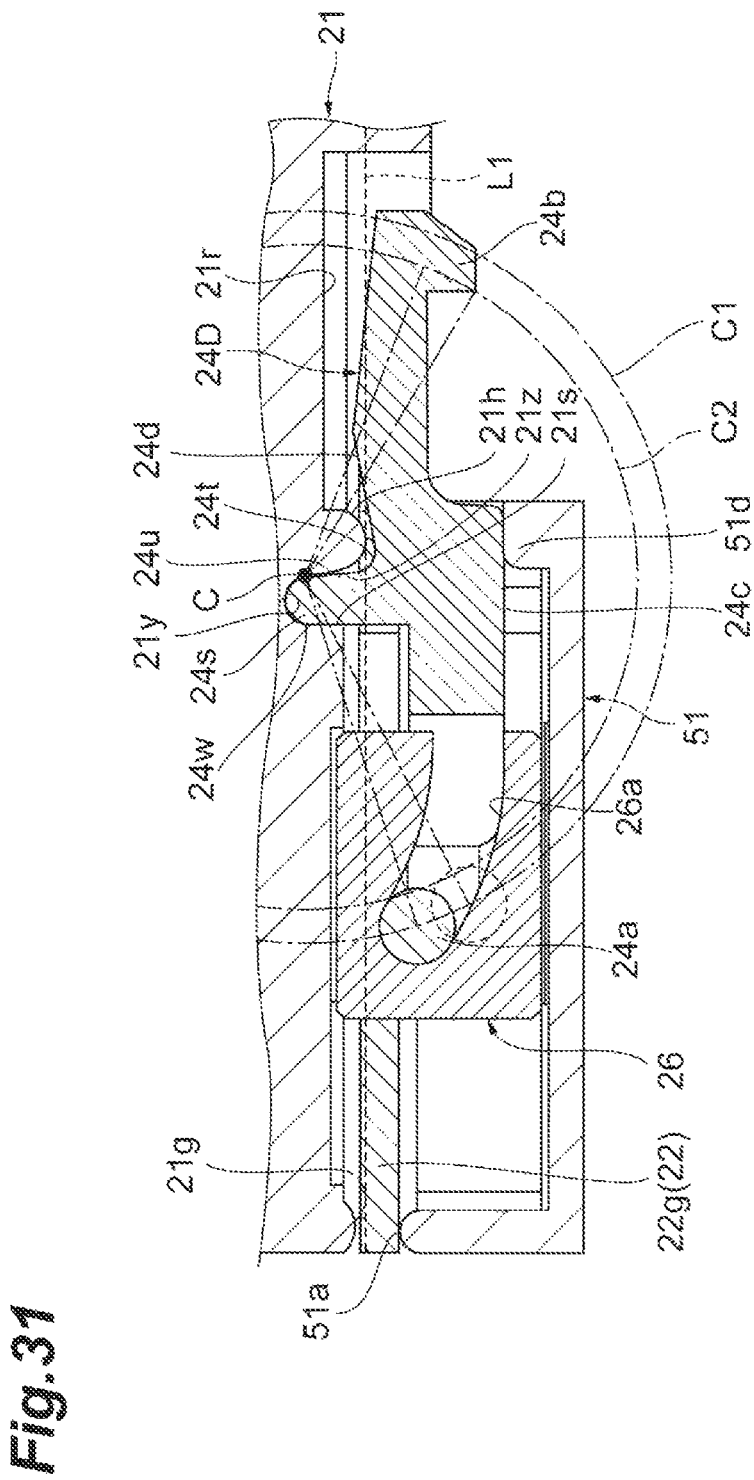
FIG. 31 is a cross-sectional view illustrating a rocking motion of the latch 24D according to the fifth modification, and illustrates a cross section of the latch 24D and the slit member 26 taken along the fitting and pulling direction A1 and the direction A2.

FIG. 31 is a cross-sectional view illustrating a rocking motion of the latch 24D according to the present modification, and illustrates a cross section of the latch 24D and the slit member 26 taken along the fitting and pulling direction A1 and the direction A2. As illustrated in FIG. 31, the latch 24D rocks about the front terminal 24u of the convex 24s. That is, the center C of the latch 24D is positioned on the front terminal 24u of the convex 24s in the present modification. Further, when the engagement between the projection 24b and the cage body 41 is released, the rocking shaft 24a moves on the arc C1 having the point C as the center, and the projection 24b moves on the arc C2 having the point C as the center. Therefore, when releasing the engagement, the projection 24b moves in a direction inclined forward with respect to the direction A2. That is, when releasing the engagement, the movement direction of the projection 24b is the direction obliquely away from the cage body 41. Therefore, it is possible to suppress the stuck between the projection 24b and the cage body 41 when releasing the engagement, and it is possible to reduce the risk that the optical transceiver 2 is not removed from the cage body 41.

As described above, the latch 24D of the present modification has the convex 24s formed on the surface on the opposite side of the cage body 41, and the convex 24s is housed in the concave 21y and contacts the wall 21z at the front terminal 24u. Further, the back terminal 24w of the convex 24s contacts the back wall 21s of the concave 21y. As a result, excessive movement of the latch 24D with respect to the housing 20 in the fitting and pulling direction A1 is restricted, and the latch 24D can be stably retained at a predetermined position.

In the present modification, the center C is positioned at the inner side on the main body 21 side of a reference surface L1 (main surface of the bottom surface 21d), which is different from the second modification. Since the center C is positioned on the inner side of the main body 21 side, it is possible to move the projection 24b in the direction inclined further forward as compared with the second modification. Therefore, it is possible to more effectively suppress the stuck of the projection 24b with the cage body 41 when the engagement is released.

The optical transceiver according to the present invention is not limited to the above-described embodiments, and other various modifications can be made. For example, the above-described embodiments and modifications may be combined with each other in accordance with necessary purposes and effects.

What is claimed is:

1. An optical transceiver insertable and ejectable with respect to a cage in a first direction, the optical transceiver comprising:

a slider having a slit including a slope in a second direction intersecting in the first direction;

a housing supporting the slider to slide along the first direction; and a latch having a projection and a shaft sliding in the slit lining up in the first direction in response to the projection, the projection engaging the cage and standing out from a surface of the latch in the second direction, wherein the housing has a pair of convexes that have the latch located therebetween wherein the pair of convexes contact an upper face and a lower face of the latch in the area between the projection and the shaft of the latch, and wherein the pair of convexes of the housing supports the latch to slide.

2. The optical transceiver of claim 1,
wherein the housing has a first part including one of the cage side of the pair of convexes of the housing, and a second part including the other of the pair of convexes of the housing, and
wherein the first part and the second part are fixed to each other.

3. The optical transceiver of claim 2,
wherein a third part including the slit of the slider is provided between the first part and the second part.

4. The optical transceiver of claim 2,
wherein housing has another slit including a slope in the second direction intersecting in the first direction,
wherein the latch has another shaft sliding in the another slit, the another shaft being provided between the first part and the shaft in the first direction, and
wherein the another slit is configured with engaging a concave of the first part and a concave of the second part each other.

5. The optical transceiver of claim 1,
further comprising an elasticity member biasing the slider to a second position of the slider engaging the projection of the latch and the cage from a first position of the slider releasing to engaging the projection of the latch and the cage.

6. The optical transceiver of claim 1,
wherein the latch has a concave in a surface opposite to the cage,
wherein the concave houses a convex opposite to the cage side of the pair of convexes in the latch, and
wherein the convex opposite to the cage side contacts a surface inside the concave.

7. The optical transceiver of claim 6,
further comprising a gap between the concave of the latch and the convex of the housing in the first direction, the gap determining a range sliding the latch in the first direction.

8. The optical transceiver of claim 6,
wherein an edge of the concave of the latch contacts the convex of the housing, and
wherein the latch moves with a center on the edge of the concave.

9. The optical transceiver of claim 1,
wherein the housing has another slit including a slope in the second direction intersecting in the first direction, and
wherein the latch has another shaft sliding in the another slit, the another shaft being provided between the pair of convexes and the shaft in the first direction.

10. The optical transceiver of claim 1,
wherein the slit has a portion extended in the first direction in a terminal of a slope in the first direction.

11. The optical transceiver of claim 1,
wherein the slit has a curve, a center of the curve being arranged with opposite to the cage.

12. The optical transceiver of claim 1,
wherein a width in the second direction of a portion in the latch contacting the pair of convexes of the housing, gradually increases based near the projection of the latch.

13. The optical transceiver of claim 1,
wherein a surface contacts the pair of convexes of the housing, the surface being a surface curved in inner cross-sectional along in the first direction and in the second direction.

* * * * *